United States Patent
Hachiya

(10) Patent No.: US 11,468,290 B2
(45) Date of Patent: Oct. 11, 2022

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Hirotaka Hachiya, Wakayama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1185 days.

(21) Appl. No.: 15/635,302

(22) Filed: Jun. 28, 2017

(65) Prior Publication Data
US 2018/0005106 A1   Jan. 4, 2018

(30) Foreign Application Priority Data

Jun. 30, 2016  (JP) .............................. JP2016-131030
Jun. 16, 2017  (JP) .............................. JP2017-118841

(51) Int. Cl.
*G06N 3/04* (2006.01)
*G06N 3/08* (2006.01)

(52) U.S. Cl.
CPC ............. *G06N 3/0454* (2013.01); *G06N 3/08* (2013.01); *G06N 3/082* (2013.01)

(58) Field of Classification Search
CPC ......... G06N 3/0454; G06N 3/08; G06N 3/082
See application file for complete search history.

(56) References Cited

U.S. PATENT DOCUMENTS

| 2012/0158623 A1* | 6/2012 | Bilenko et al. .................. 706/12 |
| 2016/0162781 A1* | 6/2016 | Lillicrap et al. ....... G06N 3/082 |
| 2017/0206450 A1* | 7/2017 | Umeda .................... G06N 3/08 |

OTHER PUBLICATIONS

Tetko et al., "Simple Heuristic Methods for Input Parameters' Estimation in Neural Networks", Jul. 2, 1994, Proceedings of 1994 IEEE International Conference on Neural Networks, pp. 376-390 (Year: 1994).*

Yosinski et al., "Understanding Neural Networks Through Deep Visualization", Jun. 22, 2015, Deep Learning Workshop, 31st International Conference on Machine Learning, pp. 1-12 (Year: 2015).*

Zeiler, et al. Visualizing and Understanding Convolutional Networks. European Conference on Computer Vision (ECCV). 2014:818-833. Part I, LNCS-8689.

Zhou, et al. "Object Detectors Emerge in Deep Scene CNNs." International Conference on Learning Representations (ICLR). 2015:1-12.

(Continued)

*Primary Examiner* — Brent Johnston Hoover
(74) *Attorney, Agent, or Firm* — Rossi, Kimms & McDowell LLP

(57) ABSTRACT

An output value of a first neural network for input data is obtained in correspondence with each category. An output value of a second neural network generated by changing a designated unit in the first neural network is obtained for the input data in correspondence with each category. For each category, change information representing a change in the output value is obtained. Information representing contribution of the designated unit are output to a display device based on the change information.

18 Claims, 16 Drawing Sheets

(56) References Cited

OTHER PUBLICATIONS

Srivastava et al. "Dropout: A Simple Way to Prevent Neural Networks from Overfitting." Journal of Machine Learning Research. 2014:1929-1958. vol. 15.

Krizhevsky et al. "ImageNet Classification with Deep Convolutional Neural Networks." Advances in Neural Information Processing Systems 25. NIPS 2012:1-9.

Jia et al. "Caffe: Convolutional Architecture for Fast Feature Embedding." Proceedings of the 22nd ACM International Conference on Multimedia. 2014:675-678.

Simonyan et al. "Two-stream Convolutional Networks for Action Recognition in Videos." Advances in Neural Information Processing System 25. NIPS 2014:1-9.

Ji et al. "3D Convolutional Neural Networks for Human Action Recognition." Pattern Analysis and Machine Intelligence. 2012:221-231. vol. 35, No. 1.

Hachiya et al. "Feature Selection for Reinforcement Learning: Evaluating Implicit State-Reward Dependency via Conditional Mutual Information." European Conference on Machine Learning. 2010:474-489.

Hinton et al. "Improving neural networks by preventing co-adaptation of feature detectors." CoRR. 2012:1-18.

\* cited by examiner

FIG. 2

CATEGORY ID: C01,C02

| LAYER ID | LAYER NAME | LOWER LAYER ID | UPPER LAYER ID | PROCESSING PARAMETER |
|---|---|---|---|---|
| L01 | INPUT LAYER | NULL | L02 | PROCESSING METHOD: DATA INPUT ... |
| L02 | Convolution1 LAYER | L01 | L03 | PROCESSING METHOD: Convolution ... |
| L03 | Pooling1 LAYER | L02 | L04 | PROCESSING METHOD: Pooling ... |
| ... | ... | ... | ... | ... |

FIG. 4

OUTPUT SCORE
C01: 10.5
C02: 3.8

| LAYER ID | UNIT ID | UNIT STATE |
|----------|---------|------------|
| L01 | F02001 | MATRIX OF FEATURE MAPS |
| ⋮ | ⋮ | ⋮ |
| L06 | F06001 | VALUE OF NEURON |

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to an information processing technique using a hierarchical neutral network.

Description of the Related Art

There is recently a service for analyzing the activity pattern of a human or a crowd or detecting a specific event from an image or a video acquired by a surveillance camera and reporting it. To implement this service, a recognition technique using machine learning and capable of recognizing the attribute of an object such as a human or a car, the type of an action such as walking or running, and the type of a personal belonging such as a bag or a basket from a moving image captured by a surveillance camera is essential. A Deep Neural Network (to be abbreviated as a DNN hereinafter) has received attention as a machine learning method to implement accurate recognition. The above-described service is used in various environments, for example, in a nursing home, an ordinary household, public spaces such as a station and an urban area, and stores such as a supermarket and a convenience store. On the other hand, learning data used to cause the DNN to learn is often acquired in an environment different from the environment where the service is actually used. For example, the learning data is sometimes acquired from a performance of a developer in a laboratory. A recognizer that has learned using such learning data depends on a feature amount unique to the learning data and cannot sufficiently deliver its performance in an environment where a surveillance camera is actually installed. For this reason, there is a growing demand for specifying a feature amount for recognition used by a learned DNN.

In Visualizing and Understanding Convolutional Networks, M. D. Ziler and R. Fergus, European Conference on Computer Vision (ECCV), 2014 (non-patent literature 1), a feature map having high activity to input image data for evaluation is selected from the feature maps of a specific layer of a learned DNN, and the feature map is returned to an input layer by sequentially performing inverse conversion of a pooling layer and a convolution layer, thereby visualizing the feature map.

In Object Detectors Emerge in Deep Scene CNNs, B. Zhou, A. Khosla, A. Lapedriza, A. Oliva and A. Torralba, International Conference on Learning Representations (ICLR), 2015 (non-Patent literature 2), image data for evaluation is divided, and a partial image obtained by removing regions is input to the learned DNN. Then, a region on the image contributing to recognition is selected based on a change in the recognition accuracy of the DNN when inputting each partial image to the DNN.

In Dropout: A Simple Way to Prevent Neural Networks from Overfitting, N. Srivastava, G. Hinton, A. Krizhevsky, I. Sutskever, and R. Salakhutdinov, Journal of Machine Learning Research 15 (2014) 1929-1958 (non-patent literature 3), a method called Dropout is proposed, in which a DNN is learned while setting the value of a neuron selected at random to zero or adding noise. This method makes it possible to suppress the number of neurons to be activated in a DNN so as to avoid excessive adaptation to learning data while improving the recognition accuracy.

In the method described in non-patent literature 1, however, the feature map contributing to recognition of the image data for evaluation is not visualized. More specifically, the information of the feature map with high activity visualized in non-patent literature 1 may be lost due to a small weight coefficient or cancel with another feature map in the process of propagation to the output layer of the DNN. In this case, the feature map of high activity does not contribute to recognition. Conversely, the information of a feature map with low activity may be enhanced by a large weight coefficient or potentiation of another feature map in the process of propagation to the output layer. In this case, the feature map of low activity contributes to recognition. Hence, in the method described in non-patent literature 1, a user cannot grasp how much a visualized feature map is used in recognition. Additionally, in the method described in non-patent literature 1, the user cannot grasp whether a feature map other than the visualized feature map contributes to recognition.

On the other hand, in non-patent literature 2, a region on image data contributing to recognition accuracy can be visualized. This allows a user to grasp which region on the image data contributes to recognition and how much the contribution is. In the visualization method of non-patent literature 2, however, a feature map is not visualized. It is therefore impossible to know which feature on the selected region of image data is actually used by the DNN for recognition. For example, if a plurality of objects exist on the same region, which object has the information contributing to recognition cannot be known. If a human face is selected, it is impossible to know which one of the facial expression, color, size, shape, hair, and parts such as an eye and a mouth contributes to recognition. Additionally, since the method described in non-patent literature 2 needs to obtain the output value of the DNN for each partial image created by removing regions, the calculation takes time.

On the other hand, in the method described in non-patent literature 3, the DNN can be learned such that a limited number of neurons contribute to recognition. In the method described in non-patent literature 3, however, the neurons contributing to recognition are not explicitly selected. For this reason, to grasp the contributing neurons, the activation state of neurons to various evaluation data needs to be analyzed by a specialist. That is, a method of specifying the neurons contributing to recognition is independently needed.

In the method described in non-patent literature 3, the neurons contributing to recognition are acquired based on learning data. However, the neurons are not necessarily useful in actual recognition. As described above, learning data acquired in a specific environment may include a bias unique to the environment. If a neuron contributing to recognition is acquired using the learning data, the neuron may erroneously express a feature amount that is unnecessary for original recognition. For example, assume that learning data to recognize actions "walk" and "run" includes a bias so that "walk" data always includes a "desk", and "run" data does not include a "desk" at all. In this case, in the method described in non-patent literature 3, a neuron corresponding to the feature amount of "desk" is acquired as a neuron contributing to recognition. However, such a bias does not exist in a general environment where the learned DNN is actually used. Hence, the neuron may be not useful but harmful for recognition. For example, if a "desk" is included in a video of action "run", the DNN may erroneously recognize the action as "walk".

As described above, in the method described in non-patent literature 3, if learning data includes a bias, a neuron contributing to recognition expresses a wrong feature amount. In addition, the user cannot easily confirm the problem.

SUMMARY OF THE INVENTION

The present invention has been made in consideration of the above-described problems, and provides a technique of specifying a feature map or a neuron of a DNN contributing to recognition of evaluation data.

According to the first aspect of the present invention, there is provided an information processing apparatus comprising: a first calculation unit configured to obtain an output value of a first neural network for input data in correspondence with each category; a second calculation unit configured to obtain an output value of a second neural network for the input data in correspondence with each category, the second neural network being generated by changing a designated unit in the first neural network; a third calculation unit configured to obtain, for each category, change information representing a change between the output value obtained by the first calculation unit and the output value obtained by the second calculation unit; and an output unit configured to output information representing contribution of the designated unit to a display device based on the change information obtained by the third calculation unit.

According to the second aspect of the present invention, there is provided an information processing method performed by an information processing apparatus, comprising: performing a first calculation to obtain an output value of a first neural network for input data in correspondence with each category; performing a second calculation to obtain an output value of a second neural network for the input data in correspondence with each category, the second neural network being generated by changing a designated unit in the first neural network; performing a third calculation to obtain, for each category, change information representing a change between the output value obtained by the first calculation and the output value obtained by the second calculation; and outputting information representing contribution of the designated unit to a display device based on the change information obtained by the third calculation.

According to the third aspect of the present invention, there is provided a non-transitory computer-readable storage medium storing a computer program configured to cause a computer to function as: a first calculation unit configured to obtain an output value of a first neural network for input data in correspondence with each category; a second calculation unit configured to obtain an output value of a second neural network for the input data in correspondence with each category, the second neural network being generated by changing a designated unit in the first neural network; a third calculation unit configured to obtain, for each category, change information representing a change between the output value obtained by the first calculation unit and the output value obtained by the second calculation unit; and an output unit configured to output information representing contribution of the designated unit to a display device based on the change information obtained by the third calculation unit.

Further features of the present invention will become apparent from the following description of exemplary embodiments (with reference to the attached drawings).

BRIEF DESCRIPTION OF THE DRAWINGS

FIG. 2 is a view showing an example of information stored in a storage unit M1;

FIG. 4 is a view showing an example of information stored in a storage unit M2;

FIG. 9 is a block diagram showing an example of the arrangement of a recognition learning system 1a;

FIG. 12 is a flowchart of the operation of the recognition learning system 1a;

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

In this embodiment, an example of an information processing apparatus having the following arrangement will be described. The information processing apparatus obtains an output value of a first neural network for input data in correspondence with each category (first calculation). Here, an output value of a second neural network generated by changing a designated unit in the first neural network is obtained for the input data in correspondence with each category (second calculation). For each category, change information representing a change between the output value obtained by the first calculation and the output value obtained by the second calculation is obtained (third calculation), and information representing contribution of the designated unit are output to a display device based on the change information obtained by the third calculation.

Figure 1:
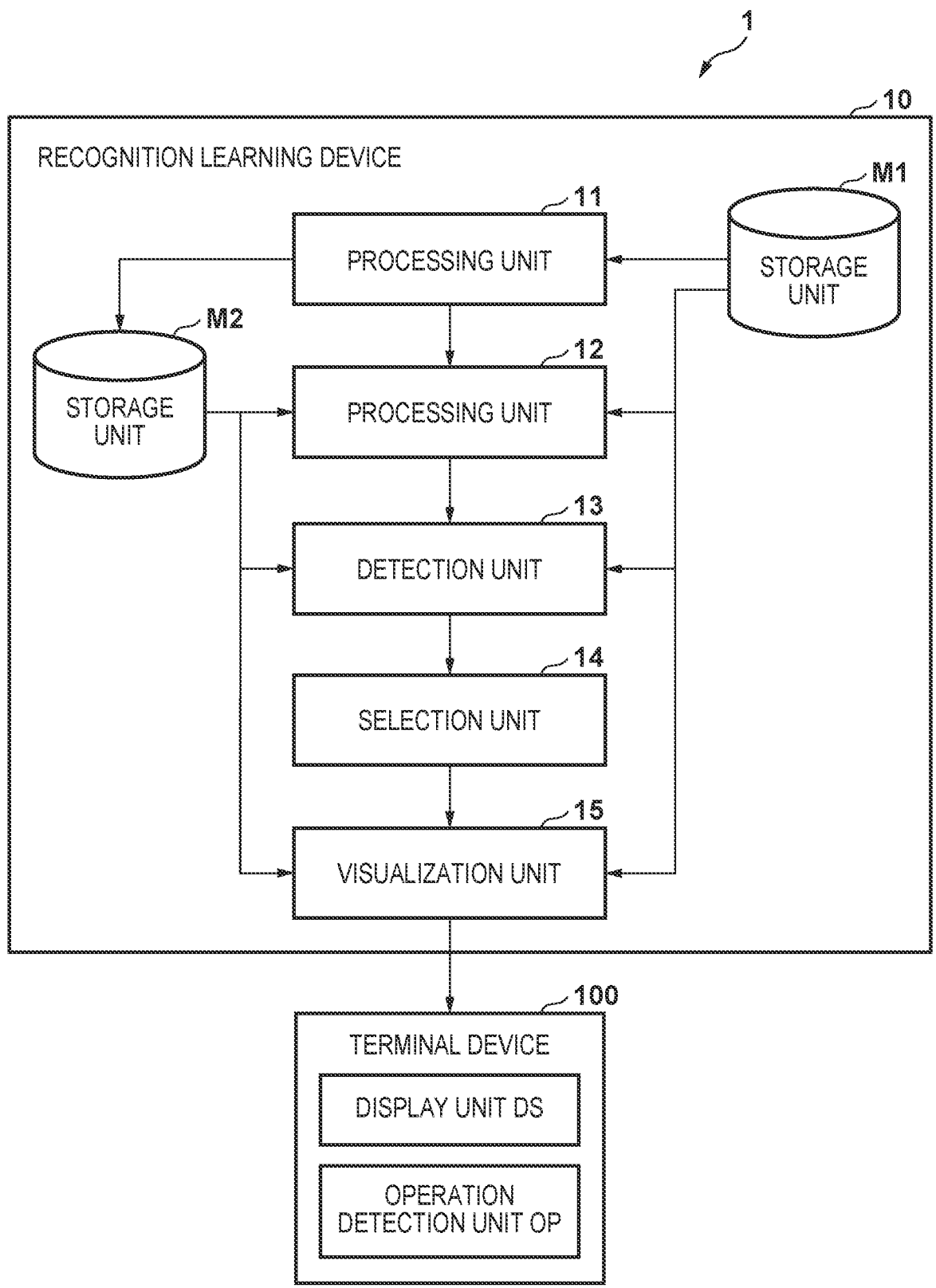
FIG. 1 is a block diagram showing an example of the arrangement of a recognition learning system 1.

In this embodiment, a case in which the information processing apparatus is applied to a recognition learning device 10 in a recognition learning system 1 as shown in FIG. 1 will be described. As shown in FIG. 1, the recognition learning system 1 includes the recognition learning device 10 and a terminal device 100. The recognition learning device 10 and the terminal device 100 are configured to communicate data to each other via a wireless or wired network. For example, a wired telephone network, a portable telephone network, or the Internet can be applied to the network. Note that FIG. 1 shows the recognition learning device 10 and the terminal device 100 as separate devices. However, the recognition learning device 10 and the terminal device 100 may be integrated into one device.

In this embodiment, a case in which the user of the recognition learning system 1 confirms whether an unnecessary feature amount is used for recognition in a DNN that has learned for a learning image or video (to be referred to as learning data hereinafter) or not will be explained. More specifically, the recognition learning system 1 specifies the feature amount of a DNN contributing to recognition of an image or video (to be referred to as evaluation data hereinafter) used for evaluation and superimposes information representing the feature amount on the evaluation data. Here, the unnecessary feature amount is, for example, a feature amount depending on an object or event that is unique to the learning data acquisition environment and is unexpectedly included in the learning data at the time of acquisition of the learning data. For example, if the learning data is data obtained by capturing a performance made in a laboratory, laboratory equipment specific to the laboratory and a habit, clothing, and posture specific to the performer correspond to the object and event unique to the learning data acquisition environment. Here, the user is, for example, a research & development worker who develops the system or a system integrator who adjusts the DNN to provide the system to an end user together with a surveillance camera. A recognition target of the DNN is an object state that can be expressed by a concept or a language, and is characterized by label information linguistically representing the state. The recognition target includes, for example, the attribute of an object such as "human" or "car", the action of an object such as "walking" or "running", and a personal belonging such as "bag" or "basket". Note that an example of the DNN is a Convolution Neural Network (to be abbreviated as a CNN hereinafter) proposed in the following literature.

ImageNet Classification with Deep Convolutional Neural Networks, A. Krizhevsky, I. Sutskever and G. E. Hinton, Advances in Neural Information Processing Systems 25 (NIPS 2012)

The terminal device 100 will be described first. The terminal device 100 is a device including a display unit DS that displays various kinds of information, and an operation detection unit OP configured to detect a user operation performed on the display unit DS. For example, a PC (Personal Computer), a tablet PC, a smartphone, or a future-phone can be applied to the terminal device 100.

The display unit DS includes an image display panel such as a liquid crystal panel or an organic EL panel, and displays various kinds of information received from the recognition learning device 10. The display unit DS displays evaluation data, unit visualization information used to visualize a feature amount generated by a visualization unit 15 (to be described later), and change information generated by a detection unit 13 and representing the contribution of the feature amount to recognition, as will be described later in detail. The display unit DS also displays a list of feature maps that constitute the DNN stored in the recognition learning device 10 or unit IDs for identifying neurons to be described later, or category IDs for identifying the categories of a recognition target.

The operation detection unit OP includes a touch sensor arranged on the image display panel of the display unit DS. The operation detection unit OP detects a user operation based on the motion of a user's finger or a touch pen, and transmits operation information representing the detected operation to the recognition learning device 10. Note that the operation detection unit OP may include an input device such as a controller, a keyboard, or a mouse, and acquire operation information representing a user operation on an image displayed on the image display panel. The operation information includes, for example, an evaluation data selection instruction, a visualization execution instruction, and a unit ID or category ID selection instruction. Note that upon detecting "visualization execution" as the operation information, the operation detection unit OP transmits evaluation data stored in the terminal device 100 to the recognition learning device 10. Upon detecting unit ID and category ID selection as the operation information, the operation detection unit OP receives unit visualization information and change information corresponding to the unit ID and the category ID from the recognition learning device 10, and causes the display unit DS to display the pieces of information superimposed on the evaluation data.

The recognition learning device 10 will be described next. A storage unit M1 stores following information in association with each category ID for identifying the category of a recognition target. That is, the storage unit M1 stores a layer ID for identifying each layer of the DNN, layer name information representing the name of the layer of the layer ID, a lower layer ID for identifying a layer immediately under the layer, an upper layer ID for identifying a layer immediately above the layer, and processing parameter information representing the processing method and the processing parameters of the layer. FIG. 2 shows an example of information stored in the storage unit M1.

In FIG. 2, a category ID of a recognition target or a layer ID is expressed as a character string including an alphabetic character and numbers. However, the expression method for the category IDs and the layer IDs is not limited to any specific expression method. In the case shown in FIG. 2, there are two categories of the recognition target. The two categories are identified by a category ID "C01" and a category ID "C02".

In FIG. 2, a layer name "input layer", a lower layer ID "NULL" (representing that no layer exists under the layer of the layer ID "L01"), an upper layer ID "L02", and a processing parameter "processing method: data input" are stored in association with the layer ID "L01". This represents that the layer of the layer ID "L01" is the "input layer", no layer exists under the input layer, the layer ID of the layer immediately above the input layer is "L02", and the processing method performed in the input layer is data input. That is, the input layer is a layer that performs processing of inputting data of an image or a video to the DNN and transferring the data having the layer ID "L02".

Additionally, in FIG. 2, a layer name "Convolution1 layer", a lower layer ID "L01", an upper layer ID "L03", and a processing parameter "processing method: Convolution . . . " are stored in association with the layer ID "L02". This represents that the layer name of the layer of the layer ID "L02" is Convolution1 layer, the layer immediately under the Convolution1 layer is the "input layer", and the layer ID of the layer immediately above the Convolution1 layer is "L03". This also represents that the processing method performed in the Convolution1 layer is processing of performing a convolution operation for data input from the input layer using a weight coefficient and a bias term as processing parameters. That is, the Convolution1 layer is a layer that performs the convolution operation using a weight coefficient and a bias term for data input from the input layer and outputs the result of the convolution operation to the layer (Pooling1 layer) having the layer ID "L03". In addition to data input and Convolution, the processing parameter also holds processing methods described in the following literature. That is, Pooling for obtaining the maximum value on a filter basis, InnerProduct for calculating the inner product of input data and a weight coefficient, and Softmax for calculating the probability that evaluation data belongs to a category can be held.

Y. Jia et al., Caffe: Convolutional Architecture for Fast Feature Embedding, 2014.

The processing parameter also includes the size, number, and stride width of filters used for processing in each layer, the values of weight coefficients and bias terms used in the Convolution layer and the InnerProduct layer, and the like.

Figure 3:
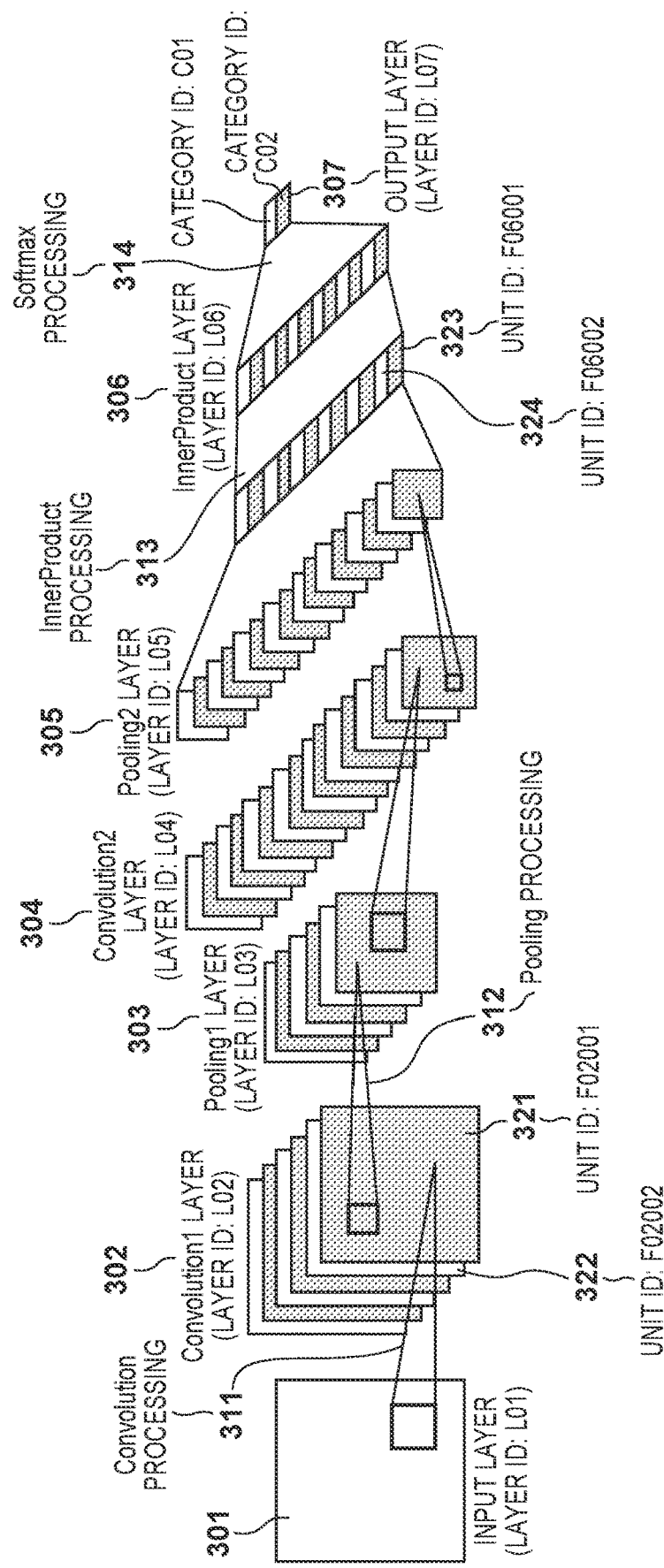
FIG. 3 is a view showing an example of the network structure of a DNN.

FIG. 3 shows an example of the network structure of a DNN predetermined by the information stored in the storage unit M1. The DNN shown in FIG. 3 is formed by an input layer 301, a Convolution1 layer 302, a Pooling1 layer 303, a Convolution2 layer 304, a Pooling2 layer 305, an InnerProduct layer 306, and an output layer 307. Processing performed between the input layer 301 and the Convolution1 layer 302 is "Convolution processing 311" predetermined by processing parameter information corresponding to the Convolution1 layer 302. Processing performed between the Convolution1 layer 302 and the Pooling1 layer 303 is "Pooling processing 312" predetermined by processing parameter information corresponding to the Pooling1 layer 303. Processing performed between the Pooling2 layer 305 and the InnerProduct layer 306 is "InnerProduct processing 313" predetermined by processing parameter information corresponding to the InnerProduct layer 306. Processing performed between the InnerProduct layer 306 and the output layer 307 is "Softmax processing 314" predetermined by processing parameter information corresponding to the output layer 307.

In FIG. 3, a plurality of feature maps exist in each of the Convolution layers and the Pooling layers, and a plurality of neurons exist in each of the InnerProduct layer and the output layer. A unit such as a feature map or a neuron is identified by a unit ID. For example, two feature maps in the Convolution1 layer 302 are identified by a unit ID "F02001" 321 and a unit ID "F02002" 322. Two neurons in the InnerProduct layer 306 are identified by a unit ID "F06001" 323 and a unit ID "F06002" 324. In FIG. 3, the category IDs=C01 and C02 of the recognition target are assigned to two neurons of the output layer 307. That is, the output value from the neuron of the category ID=C01 is output score information corresponding to the category ID=C01, and the output value from the neuron of the category ID=C02 is output score information corresponding to the category ID=C02, as will be described later in detail.

As described above, the pieces of information stored in the storage unit M1 predetermine the network structure of the DNN. Hence, the pieces of information stored in the storage unit M1 are sometimes called the structure information of the DNN.

A storage unit M2 stores unit state information representing the state of each unit, which is the processing result of each layer of the DNN for evaluation data, and output score information representing the output score of the DNN for each category of the recognition target. More specifically, the storage unit M2 stores the output score information of the DNN for each category in association with a category ID for identifying each category. The storage unit M2 also stores a unit ID for identifying a unit such as a feature map or a neuron in a layer and unit state information representing the state of the unit in association with a layer ID for identifying the layer of the DNN. FIG. 4 shows an example of information stored in the storage unit M2.

In FIG. 4, a unit ID is expressed as a character string including an alphabetic character and numbers. However, the expression method for the unit IDs is not limited to any specific expression method. The unit ID is generated based on the layer ID of the layer to which the unit belongs and the order of the unit in the layer. For example, the unit ID of the first unit of the layer of the layer ID "L02" is "F02001". The unit ID of the second unit of the layer is "F02002".

In FIG. 4, "10.5" is stored as output score information for the category ID "C01", and "3.8" is stored as output score information for the category ID "C02". The unit ID "F02001" and a matrix of feature maps as a unit state are stored in association with the layer ID "L01". The unit ID "F06001" and the value of a neuron as a unit state are stored in association with a layer ID "L06".

Referring back to FIG. 1, a processing unit 11 calculates the output score information of each recognition target category of the DNN for evaluation data, and stores the unit state information of each unit obtained in the process of calculation in the storage unit M2. More specifically, the processing unit 11 reads out the category ID of the category of the recognition target of the DNN, and a lower layer ID, an upper layer ID, and processing parameter information associated with each layer ID from the storage unit M1. The processing unit 11 constructs a DNN based on the readout structure information, and applies processing parameter information corresponding to each layer to the evaluation data received from the terminal device 100 in the order from the lowermost layer to the uppermost layer, thereby performing processing. The processing unit 11 stores output score information corresponding to the category ID read out from the storage unit M1 in the storage unit M2 in association with the category ID.

Note that in this embodiment, an image is used as evaluation data. However, the evaluation data is not limited to an image. For example, a video can be used as a recognition target as proposed in the following literatures.

Two-stream convolutional networks for action recognition in videos, K. Simonyan and A. Zisserman, Advances in Neural Information Processing System 25 (NIPS), 2014.

3D Convolutional Neural Networks for Human Action Recognition, S. Ji, W. Xu, M. Yang and K. Yu, Pattern Analysis and Machine Intelligence, vol. 35, no. 1, pp. 221-231, 2012

The processing unit 11 stores the unit state information of each unit in the process from evaluation data input to the input layer to obtaining of the output of the uppermost layer in the storage unit M2 in association with the layer ID of the layer to which the unit belongs and the unit ID of the unit. The processing unit 11 then outputs a trigger to a processing unit 12.

According to the input of the trigger from the processing unit 11, the processing unit 12 reads out the category ID of the recognition target, and a lower layer ID, an upper layer ID, and processing parameter information associated with each layer ID from the storage unit M1. The processing unit 12 also reads out output score information associated with the category ID and unit state information associated with each layer ID and each unit ID from the storage unit M2. The processing unit 12 performs predetermined processing for unit state information corresponding to a specific unit ID of the readout unit IDs. Here, the specific unit ID is a unit ID designated (set) by the user in advance as a unit ID for identifying a unit (visualization target unit) of a visualization target. For example, if the user wants to set the first feature map of the Convolution1 layer to the visualization target, "F02001" is set as the specific unit ID. If the user wants to set all feature maps of the Convolution1 layer to the visualization target, "F02*" using a wild card is set as the specific unit ID. Various kinds of processing can be considered as the predetermined processing to be performed for the unit state information corresponding to the specific unit ID. For example, two types of processing (first processing and second processing) to be described below can be considered.

In the first processing, the processing unit 12 generates, as additional unit information, a set including only 0s as elements and having the same size as the set of numerical values represented by unit state information corresponding to a specific unit ID of pieces of unit state information read out from the storage unit M2. For example, if unit state information represents a matrix of feature maps, a matrix including only 0s as elements and having the same size as the matrix is generated as additional unit information. If unit state information is the value of a neuron, a neuron value that is 0 is generated as additional unit information. Since the unit state information corresponding to the specific unit ID is replaced with a unit (a feature map or a neuron) including only 0s as elements, the output from the unit is 0, and a state in which the unit is apparently deleted is obtained on the DNN.

In the second processing, the processing unit 12 generates, as additional information, a set including only random values as elements and having the same size as the set of numerical values represented by unit state information corresponding to specific unit ID of pieces of unit state information read out from the storage unit M2. The random values have, for example, an independent and identical distribution, a normal distribution, or a Laplace distribution. For example, if unit state information represents a matrix of feature maps, a matrix including only random values as elements and having the same size as the matrix is generated as additional information. If unit state information is the value of a neuron, a neuron value that is a random value is generated as additional information. Then, the processing unit 12 adds the additional information to the unit state information corresponding to the specific unit ID (performs the addition for each corresponding element), thereby generating additional unit information.

The processing unit 12 then outputs the specific unit ID (the unit ID of the unit state information that is the target of the predetermined processing) and the additional unit information to the detection unit 13.

The detection unit 13 reads out the category ID of the recognition target and the lower layer ID, the upper layer ID, and the processing parameter information associated with the layer ID from the storage unit M1. The detection unit 13 also reads out the output score information associated with the category ID, and the unit state information associated with the layer ID and the unit ID from the storage unit M2. Then, the detection unit 13 calculates the output score information of each recognition target category of the DNN for the evaluation data, like the processing unit 11. At this time, the detection unit 13 uses the additional unit information as unit state information corresponding to the specific unit ID. Additionally, the detection unit 13 need not recalculate unit state information associated with the layer ID corresponding to the layer under the layer ID corresponding to the specific unit ID, and can use unit state information stored in the storage unit M2. For example, if the predetermined processing is performed for a unit of the Convolution2 layer, pieces of unit state information of the Convolution1 layer and the Pooling1 layer are reused to calculate output score information.

The detection unit 13 thus calculates the output score information of each recognition target category of the DNN for the evaluation data in a case in which the unit corresponding to the specific unit ID is replaced with the additional unit information. The detection unit 13 obtains, for each category, a change in the calculated output score information (change information representing the change in the output score information caused by the replacement of the unit corresponding to the specific unit ID with the additional unit information) with respect to the output score information stored in the storage unit M2. Various kinds of calculation processing can be considered as change information calculation processing. For example, two types of calculation processing (first calculation processing and second calculation processing) to be described below can be considered.

In the first calculation processing, the detection unit 13 obtains, as the change information, the difference between the output score information stored in the storage unit M2 and the output score information of the DNN for the evaluation data in a case in which the unit state information corresponding to the specific unit ID is replaced with the additional unit information. In the first calculation processing, the change information is obtained by, for example, $$\Delta S_{c,u} = |S_{c,u} - S_c| \quad (1)$$

Note that to prevent the difference from taking a negative value, an absolute value may be calculated, like equation (1).

In equation (1), $\Delta S_{c,u}$ is change information obtained for a category c in a case in which unit state information corresponding to a unit ID=u is replaced with additional unit information. $S_c$ is the output score information of the category c read out from the storage unit M2, and $S_{c,u}$ is output score information output from the DNN in correspondence with the category c in a case in which the unit state information corresponding to the unit ID=u is replaced with the additional unit information.

In the second processing, the detection unit 13 obtains, as the change information, the correlation coefficient between the addition information used to generate the additional unit information and the output score information of the DNN for the evaluation data in a case in which the unit state information corresponding to the specific unit ID is replaced with the additional unit information. In this case, the processing unit 12 needs to further output the addition information to the detection unit 13. More specifically, the processing unit 12 and the detection unit 13 perform the following processing for each visualization target unit (or a part thereof). More specifically, the processing unit 12 generates additional unit information by adding addition information to the unit state information of the visualization target unit. The detection unit 13 calculates the output score information of the DNN using the additional unit information in place of the unit state information of the visualization target unit. Using the calculated output score information and the addition information used to calculate the output score information, the detection unit 13 calculates $$\Delta S_{c,u} = \frac{\sum_{i=1}^{N}(S_{c,u,i} - \overline{S_{c,u}})\sum_{i=1}^{N}(a_i - \overline{a_i})}{\sqrt{\sum_{i=1}^{N}(S_{c,u,i} - \overline{S_{c,u}})^2 \sum_{i=1}^{N}(a_i - \overline{a_i})^2}} \quad (2)$$

thereby calculating a correlation coefficient as the change information.

In equation (2), N is the number of repetitions (the number of sets), $S_{c,u,i}$ is the output score information of the category c in a case in which the unit state information corresponding to the unit ID=u is replaced with additional unit information generated by the ith predetermined processing, and $a_i$ is the ith addition information.

Figure 5:
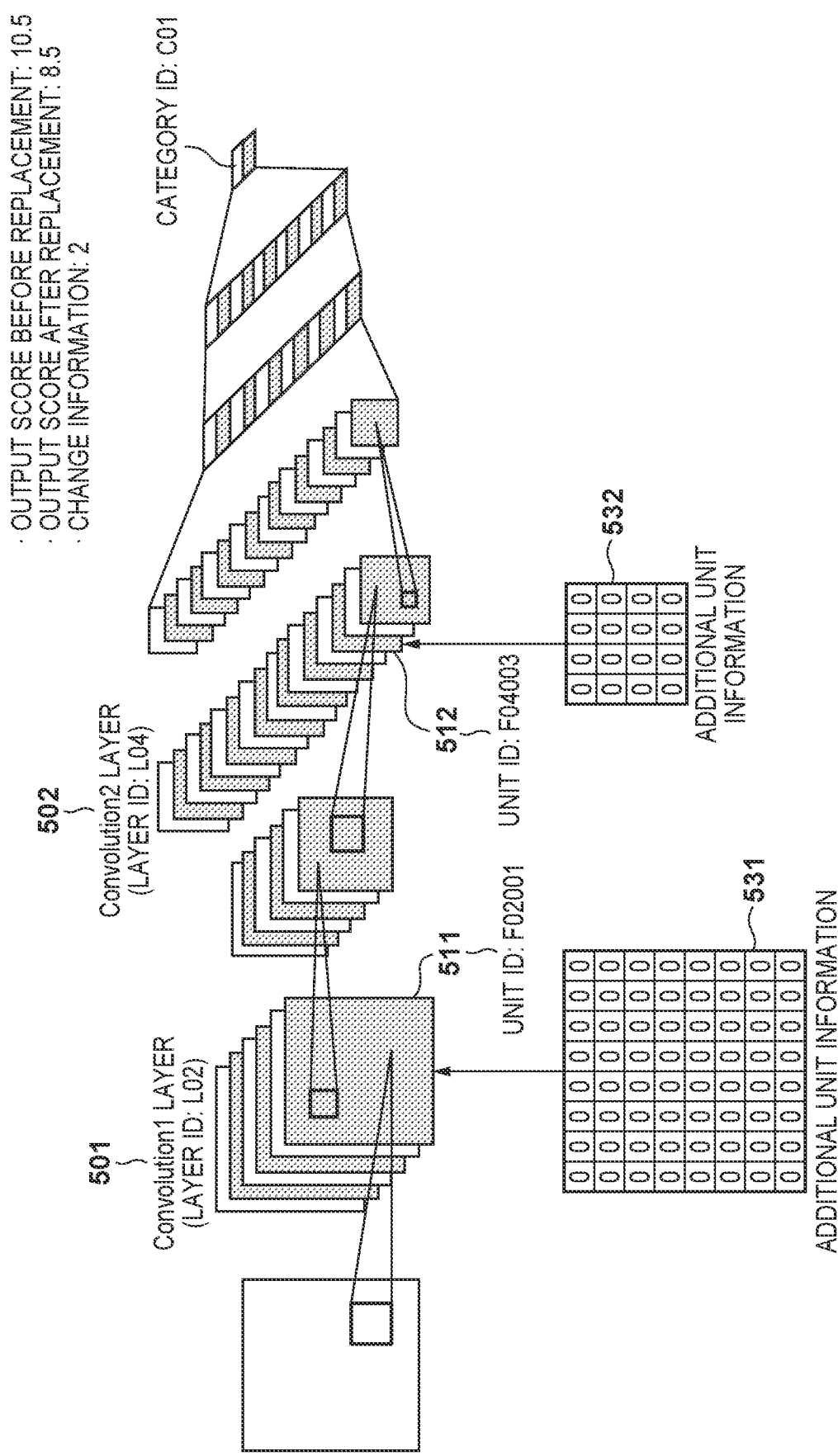
FIG. 5 is a view for explaining a method of obtaining change information.

A change information obtaining method used when the processing unit 12 has executed the above-described first processing will be described with reference to FIG. 5. In FIG. 5, units (units 511 and 512) included in a Convolution1 layer 501 and a Convolution2 layer 502 of a DNN are set to visualization target units. In this case, the processing unit 12 generates a unit (additional unit information) 531 including only 0s as elements and having the same size as the unit 511, and also generates a unit (additional unit information) 532 including only 0s as elements and having the same size as the unit 512.

In FIG. 5, the detection unit 13 obtains the output score information of the DNN in a case in which the unit 511 is replaced with the unit 531 (the output score information of the DNN in a case in which the unit 512 is replaced with the unit 532) as 8.5. In FIG. 5, the output score information of the DNN before the replacement is 10.5. Hence, the change information is 2. Such change information calculation processing is performed on a category basis.

In this way, the processing unit 12 and the detection unit 13 can calculate change information for each category on a visualization target unit basis. That is, the following series of processes is performed for each visualization target unit. That is, the output score information of the DNN for each category in a case in which the unit state information of the visualization target unit is replaced with additional unit information is calculated, and change information with respect to the output score information of the DNN for each category before the replacement is obtained.

The detection unit 13 outputs the set of the specific unit ID, the change information, and the unit state information to a selection unit 14 on a category ID basis. That is, the detection unit 13 outputs the set of the change information $\Delta S_{c,u}$ for each category c calculated by equation (1) or (2) to the selection unit 14.

Based on the input change information, the selection unit 14 selects the unit ID of a unit having high contribution to recognition for each input category ID. As the unit ID selection method, the selection unit 14 selects a unit ID with a large value of change information as the unit ID of a unit of high contribution for each category ID. More specifically, for example, the selection unit 14 selects all unit IDs having change information equal to or more than a threshold for each category ID. Alternatively, the selection unit 14 selects a predetermined number of unit IDs with change information from the top in descending order of the value of change information for each category ID. The selection unit 14 then outputs each set of a selected unit ID and change information to the visualization unit 15 on a category ID basis. Note that the selection unit 14 may select a unit contributing to recognition not for each category but in all categories. For example, the selection unit 14 obtains a statistical value such as an average value, sum, or maximum value of the change information of specific unit IDs in all categories, and selects a unit having a large statistic value.

Note that the threshold to be compared with the change information or the number of unit IDs to be selected can be set by manually adjusting a numerical value displayed on the display unit DS of the terminal device 100. The operation detection unit OP detects the manual operation of changing the numerical value, and outputs the numerical value and the operation information to the recognition learning device 10. According to the input of the numerical value and the operation information from the terminal device 100, the recognition learning device 10 stores the numerical value in an internal memory (not shown) of the recognition learning device 10 as the threshold or the number of unit IDs to be selected.

The visualization unit 15 generates information used to visualize a unit corresponding to a unit ID received from the selection unit 14 as unit visualization information. More specifically, the visualization unit 15 reads out a lower layer ID, an upper layer ID, and processing parameter information associated with each layer ID from the storage unit M1. The visualization unit 15 generates unit visualization information based on the lower layer ID, the upper layer ID, and the processing parameter information read out from the storage unit M1. For example, a method of returning unit state information to the input layer by sequentially performing inverse conversion of the pooling layer and the convolution layer on the lower side, as described in non-patent literature 1, can be used. This enables specification of a target (feature) corresponding to the visualization target unit on an image serving as evaluation data. Information representing the region of the specified target (feature) on the image and an object arranged in the region is the unit visualization information.

The visualization unit 15 then transmits each unit ID and change information received from the selection unit 14, and the layer ID, the category ID, and the unit visualization information corresponding to the unit ID to the terminal device 100.

Figure 6:
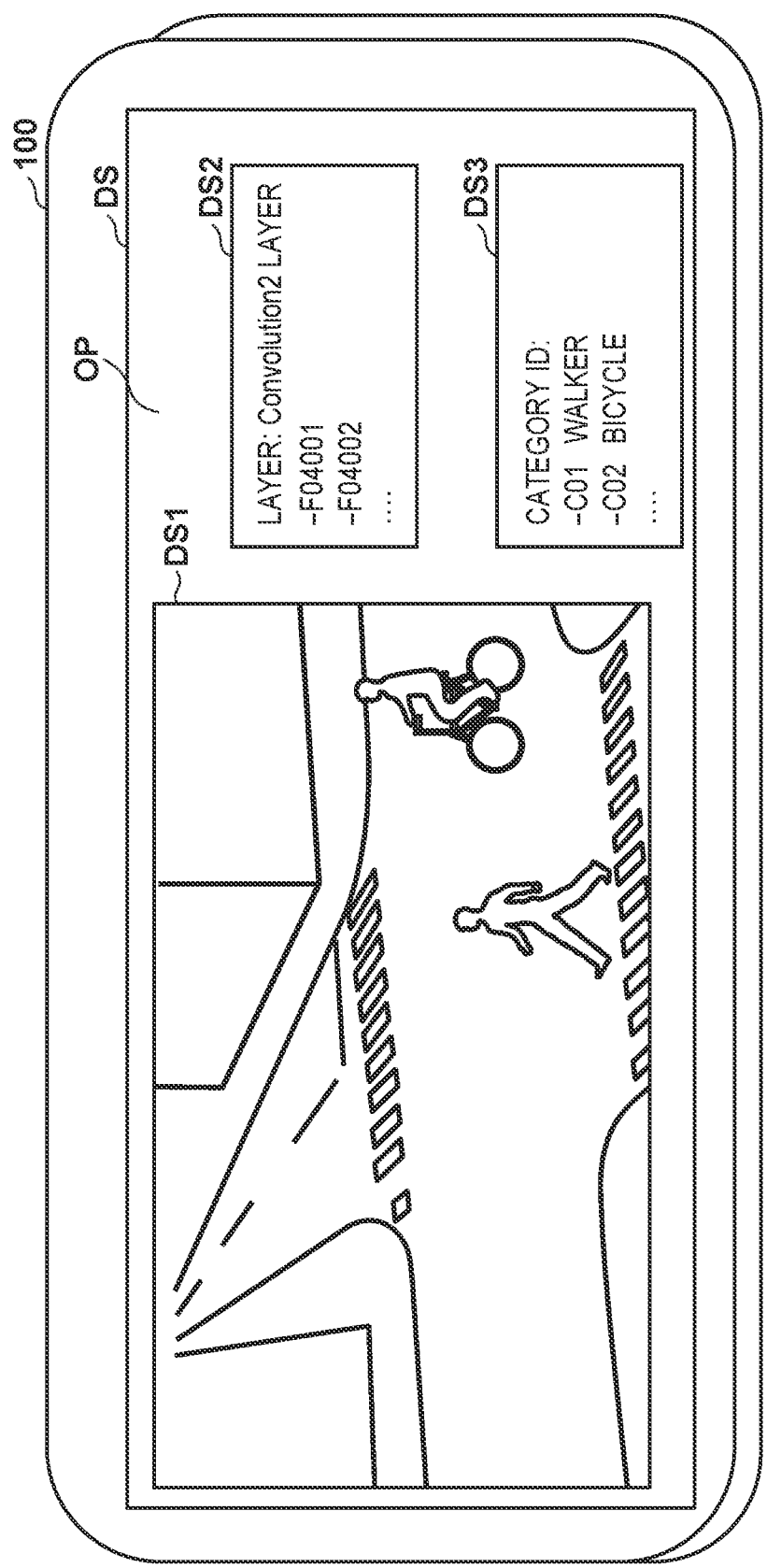
FIG. 6 is a view showing an example of display of a GUI.
Figure 7:
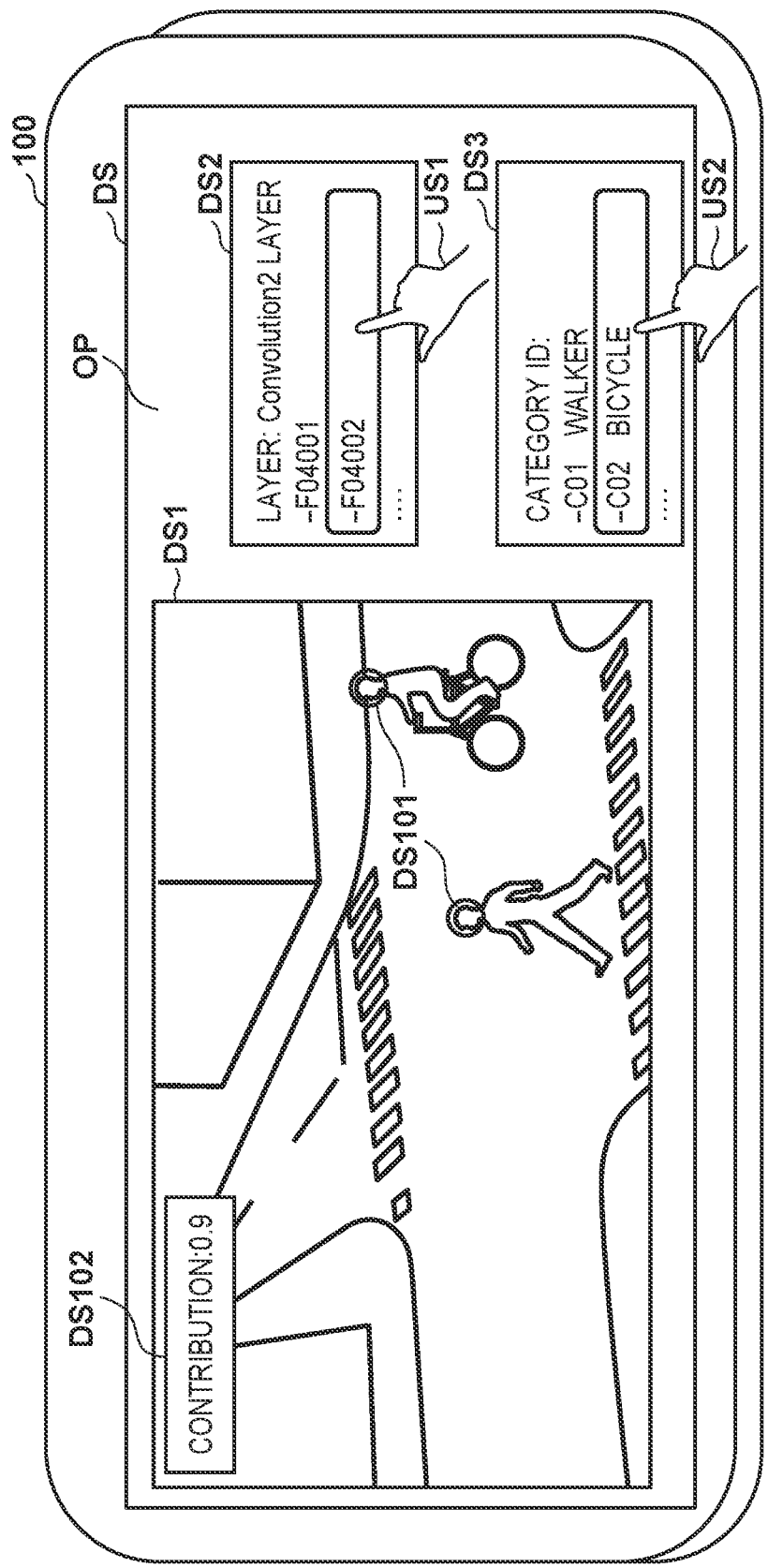
FIG. 7 is a view showing an example of display of a GUI.

A GUI (Graphical User Interface) shown in FIG. 6 is displayed on the display unit DS of the terminal device 100. On this GUI, DS1 represents an image serving as evaluation data held by the terminal device 100. DS2 represents a display region to display a list of unit IDs and a layer ID received from the visualization unit 15. DS3 represents a display region to display a list of category IDs received from the visualization unit 15. Assume that the operation detection unit OP detects that one of the unit IDs displayed in the list in the display region DS2 is designated by a manual operation US1 of the user on the GUI, as shown in FIG. 7. Also assume that the operation detection unit OP detects that one of the category IDs displayed in the list in the display region DS3 is designated by a manual operation US2 of the user. Then, of the pieces of change information received from the recognition learning device 10, change information corresponding to the designated unit ID and category ID is displayed as a contribution DS102 on the display unit DS of the terminal device 100, as shown in FIG. 7. In addition, an object DS101 represented by unit state information corresponding to the designated unit ID is displayed in each region (head region) of the display unit DS represented by the unit state information. Both the contribution DS102 and the object DS101 are superimposed on the image serving as the evaluation data. However, the layout on the GUI is not limited to the layout shown in FIG. 7. Hence, when displaying the contribution DS102 and the object DS101, they need not always be superimposed on the image serving as the evaluation data. It should be noted that information representing contribution of the designated unit may not be the change information. The information representing contribution can be normalized, indicated as a level corresponding to a range of values, and may be presented in a form of graph.

Figure 8:
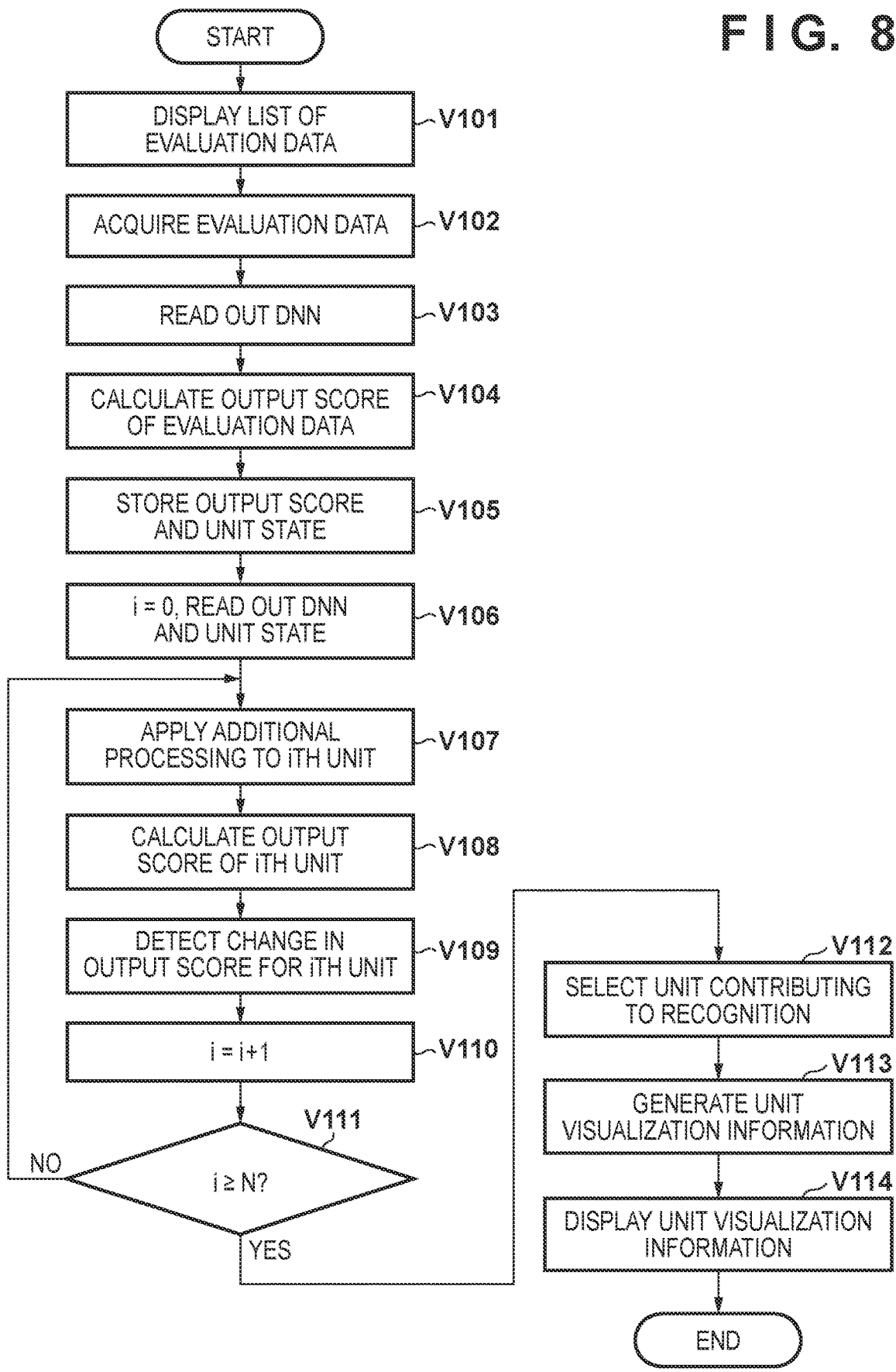
FIG. 8 is a flowchart of the operation of the recognition learning system 1.

The operation of the above-described recognition learning system 1 will be described next with reference to the flowchart of FIG. 8. FIG. 8 is a flowchart showing an example of visualization of a feature amount contributing to recognition processing of the DNN. Note that the processes shown in FIG. 8 have already been described above in detail, and will only briefly be explained below.

First, the display unit DS of the terminal device 100 displays a list of evaluation data (step V101). The list of evaluation data may be, for example, a list of thumbnails of images or a list of video previews. If the operation detection unit OP detects that the user performs an operation of selecting one data from the list of evaluation data and inputs a "visualization execution" instruction, the terminal device 100 transmits the evaluation data selected from the list to the recognition learning device 10 (step V102). The processing unit 12 of the recognition learning device 10 receives the evaluation data transmitted from the terminal device 100 (step V102).

Next, the processing unit 11 of the recognition learning device 10 reads out the category ID of the category of the recognition target of the DNN, and a lower layer ID, an upper layer ID, and processing parameter information associated with each layer ID from the storage unit M1 (step V103).

Next, based on the readout structure information, the processing unit 11 applies processing parameter information corresponding to each layer to the evaluation data received from the terminal device 100 in the order from the lowermost layer to the uppermost layer, thereby obtaining output score information for each category (step V104).

The processing unit 11 stores, of the output (output score information) from the uppermost layer of the DNN, output score information corresponding to the category ID read out from the storage unit M1 in the storage unit M2 in association with the category ID (step V105). The processing unit 11 also stores the unit state information of each unit in the storage unit M2 in association with the layer ID of the layer to which the unit belongs and the unit ID of the unit (step V105). The processing unit 11 then outputs a trigger to the processing unit 12.

Next, the processing unit 12 initializes the value of a counter variable i used to count the number of visualization target units to 0 (step V106). The processing unit 12 also reads out the category ID of the recognition target, and a lower layer ID, an upper layer ID, and processing parameter information associated with each layer ID from the storage unit M1 (step V106). The processing unit 12 also reads out output score information associated with the category ID and unit state information associated with the layer ID and the unit ID from the storage unit M2 (step V106).

Let N (N is an integer not less than 2) be the number of specific unit IDs of the readout unit IDs. The processing unit 12 performs predetermined processing for unit state information corresponding to the ith specific unit ID, thereby generating additional unit information (step V107). The processing unit 12 outputs the ith specific unit ID and the additional unit information generated for the ith specific unit ID to the detection unit 13 (step V107).

The detection unit 13 calculates the output score information of each recognition target category of the DNN for the evaluation data, like the processing unit 11. At this time, the detection unit 13 uses the additional unit information in place of the unit state information corresponding to the ith specific unit ID (step V108).

The detection unit 13 obtains the change between the output score information calculated in step V108 and the output score information stored in the storage unit M2 for each category (step V109). The detection unit 13 increments the value of the counter variable i by one (step V110). If the incremented value of the counter variable i is N or more, the process advances to step V112 via step V111. If the value is less than N, the process returns to step V107 via step V111.

The selection unit 14 selects the unit ID of a unit having high contribution to recognition for each category ID, and outputs the set of the selected unit ID and the change information to the visualization unit 15 on a category ID basis (step V112).

The visualization unit 15 generates, as unit visualization information, information used to visualize a unit corresponding to the unit ID received from the selection unit 14 (step V113). The visualization unit 15 then transmits the unit ID and the change information received from the selection unit 14, and the layer ID, the category ID, and the unit visualization information corresponding to the unit ID to the terminal device 100 (step V113).

The display unit DS of the terminal device 100 displays the image serving as the evaluation data held by the terminal device 100, a list of unit IDs and a layer ID received from the visualization unit 15, and a list of category IDs received from the visualization unit 15. Assume that the user designates a unit ID and a category ID on the GUI in this state. Then, the display unit DS displays contribution represented by change information corresponding to the designated unit ID and category ID, and object represented by unit visualization information corresponding to the designated unit ID, which are superimposed on the evaluation data (step V114).

As described above, according to this embodiment, it is possible to visualize the information of a unit such as a feature map or a neuron of the DNN contributing to recognition of evaluation data. Hence, the user can confirm whether an unnecessary feature amount such as a feature amount unique to learning data is used for recognition or not. If it is found that the DNN uses an unnecessary feature amount for recognition, the user can delete data including the feature amount from the learning data and relearn the DNN. This allows the user to obtain a DNN that does not use any unnecessary feature amount.

In this embodiment, when detecting a change in output score information, the already calculated state of each unit is reused. Hence, a unit contributing to recognition can be obtained at a high speed. In particular, a unit in an upper layer can be obtained at a higher speed because many units in lower layers are reusable. For this reason, the user can confirm the feature amount contributing to recognition of the DNN using more evaluation data.

Note that in this embodiment, a case in which a unit contributing to recognition is selected based on an independent change in output score information for each unit has been described. However, the series of processes may be performed in consideration of the co-occurrence of a plurality of units. For example, a combination of units that approximately maximizes the change in output score information may be selected using forward selection or backward selection described in the following literature.

Feature Selection for Reinforcement Learning: Evaluating Implicit State-Reward Dependency via Conditional Mutual Information, H. Hachiya & M. Sugiyama, ECML2010

Second Embodiment

Figure 9:
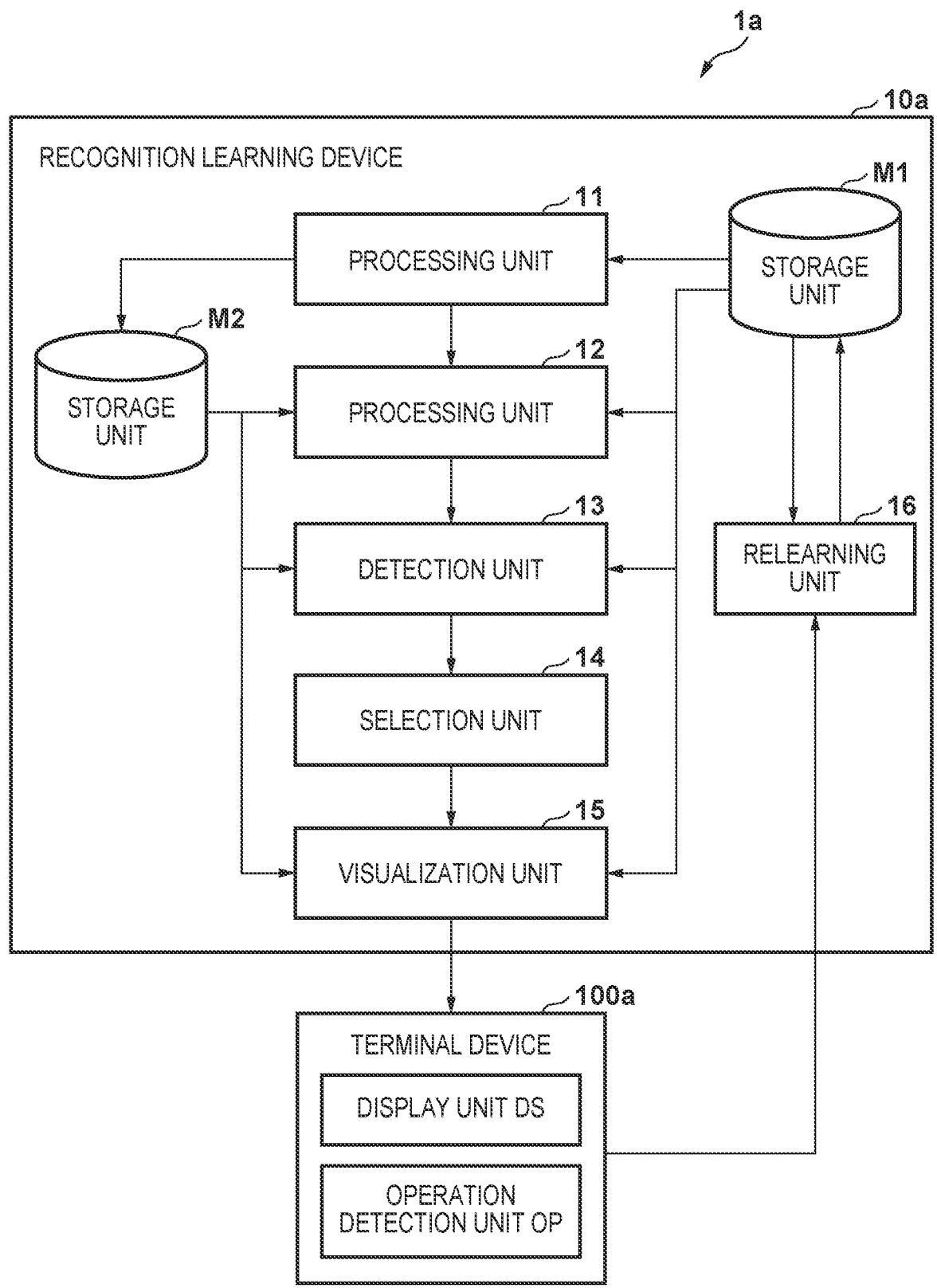

In the following embodiments including this embodiment, the difference from the first embodiment will mainly be described, and the rest is assumed to be the same as in the first embodiment, unless otherwise specified. An example of the arrangement of a recognition learning system $1a$ according to this embodiment will be described with reference to FIG. 9. The recognition learning system $1a$ according to this embodiment is configured to cause a user to confirm whether a learned DNN uses an unnecessary feature amount for recognition or not, and if an unnecessary feature amount is used, set a low importance for the feature amount and make the recognizer to do relearning. That is, the second embodiment is different from the first embodiment in that a recognition learning device $10a$ relearns the DNN based on operation information representing feedback from the user for a visualized feature amount.

The recognition learning system $1a$ according to this embodiment includes the recognition learning device $10a$ and a terminal device $100a$. The recognition learning device $10a$ and the terminal device $100a$ are configured to communicate data to each other via a wireless or wired network, as in the first embodiment.

An operation detection unit OP of the terminal device $100a$ detects operation information of the user on a display unit DS, as in the first embodiment. In this embodiment, the operation detection unit OP also detects a setting instruction of importance information (to be described later) or a relearning execution instruction for the DNN.

Figure 10:
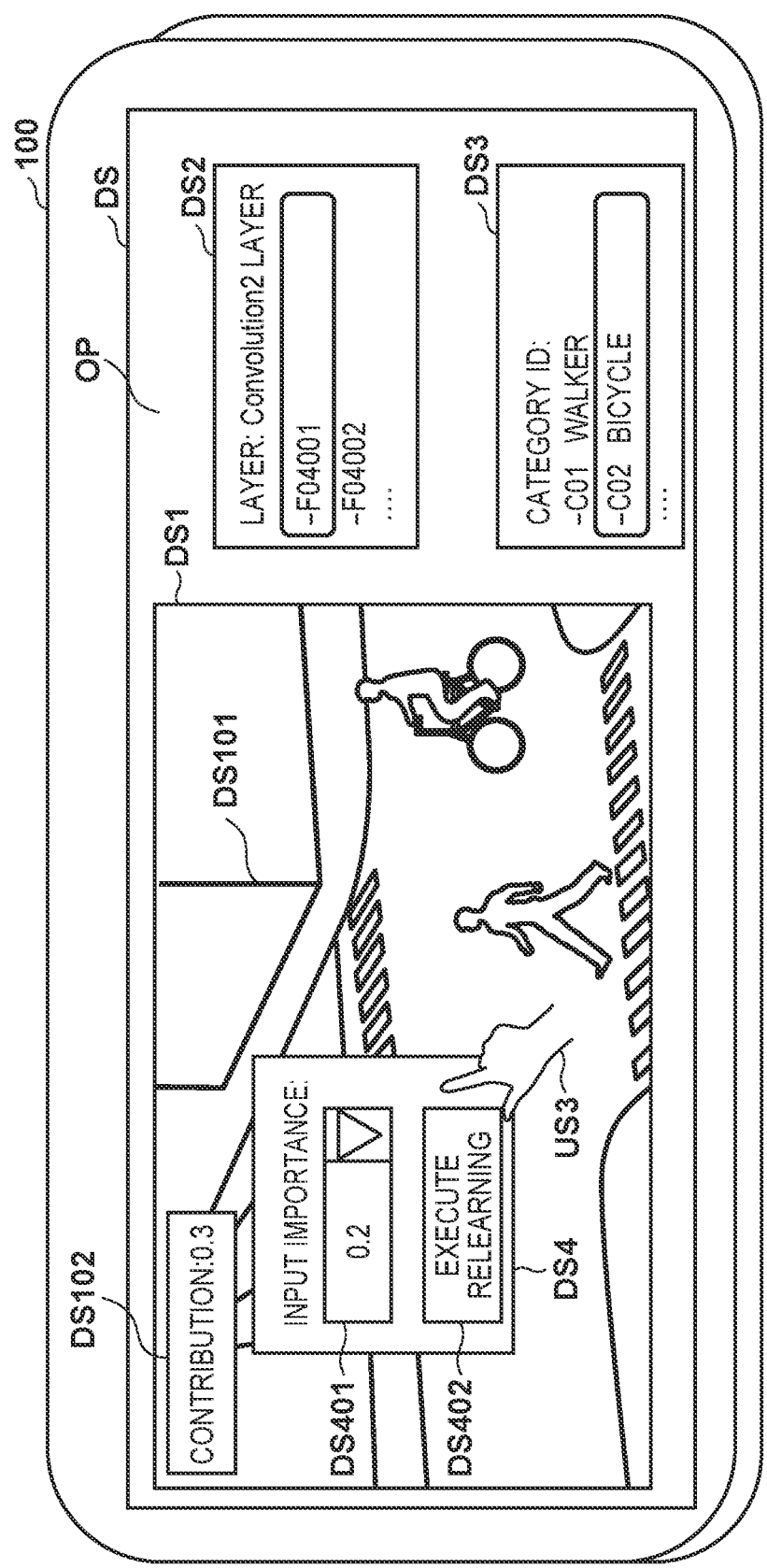
FIG. 10 is a view showing an example of display of a GUI.

In this embodiment, the display unit DS displays a GUI shown in FIG. 10 in place of the GUI shown in FIG. 7. On the GUI shown in FIG. 10, "F04001" is selected as a unit ID from a display region DS2, and "C02" is selected as a category ID from a display region DS3. As a result, an object DS101 (an object represented by unit visualization information) is superimposed on a building (a region represented by unit visualization information) in the background. Additionally, on the GUI shown in FIG. 10, an importance pull-down menu DS401 used to acquire a feedback operation US3 from the user for the unit (feature amount) represented by the object DS101 and a relearning execution button DS402 are displayed in a display region DS4. When the user instructs the pull-down menu DS401, a list of a plurality of importances (represented by, for example, real numbers from 0 to 1: a larger value represents a higher importance, and a smaller value represents a lower importance) is displayed. Hence, the user can select and designate one importance from the list. The user can instruct the recognition learning device $10a$ to do relearning by instructing the execution button DS402.

The operation detection unit OP detects operation information representing an operation by the user for the pull-down menu DS401 or the execution button DS402. If the operation information represents "importance input using the pull-down menu DS401", the terminal device $100a$ stores importance information representing the input importance in association with the unit ID of a visualization target unit corresponding to the object DS101. On the other hand, if the operation information represents "instruction of the execution button DS402", the terminal device $100a$ transmits stored importance information and a unit ID stored in association with the importance information to the recognition learning device $10a$ together with a relearning execution instruction. Note that if the user does not set an importance using the pull-down menu DS401, importance information representing a default importance is transmitted. The default importance is not limited to a specific importance, and is, for example, 1. As the default importance, the value of change information input from the recognition learning device $10a$ in association with the unit ID may be set.

On the other hand, upon receiving a relearning execution instruction from the terminal device $100a$, a relearning unit 16 of the recognition learning device $10a$ learns the DNN based on the importance information using learning data. More specifically, according to the input of the set of a unit ID and importance information from the terminal device $100a$, the relearning unit 16 reads out the category ID of the recognition target of the DNN, and a lower layer ID, an upper layer ID, and processing parameter information associated with each layer ID from a storage unit M1. Using a learning method with importance based on the structure information of the DNN read out from the storage unit M1 and the importance information received from the terminal device $100a$, the relearning unit 16 updates the processing parameter information so as to minimize the identification error of the DNN with respect to the learning data. The processing parameter information updated here includes, for example, the values of a weight coefficient and a bias term in Convolution processing or InnerProduct processing. The learning data is data formed by a plurality of sets of input data such as an image or a video and category IDs to which the input data belongs and is created in advance. As the learning method with importance, for example, two learning methods to be described below exist.

As the first learning method, based on the unit ID and importance information received from the terminal device $100a$, the relearning unit 16 sets a ratio of dropout of each unit in the structure information of the DNN read out from the storage unit M1. Dropout is processing of temporarily disconnecting a unit selected at random from the network in each iteration of the learning process, as proposed in non-patent literature 3 described above. Processing parameter information associated with a dropped unit is not updated in the iteration.

The ratio of dropout of each unit is normally set to a fixed value of, for example, 0.5 (see the above literature). In the first learning method, the ratio is set based on input importance information by $$r = 0.5 + (1-I)/2 \qquad (3)$$

where r is the dropout ratio, and I is the importance represented by importance information. For example, if the importance I is 1, the dropout ratio is set to the normal ratio of 0.5. However, for a unit whose importance I is 0.1, the dropout ratio is set to a value higher than the normal ratio, for example, 0.95. Accordingly, a unit of a low importance is dropped out at a high frequency, and the processing parameter information of the unit is rarely updated. For this reason, the contribution of the unit to recognition becomes relatively low.

Figure 11:
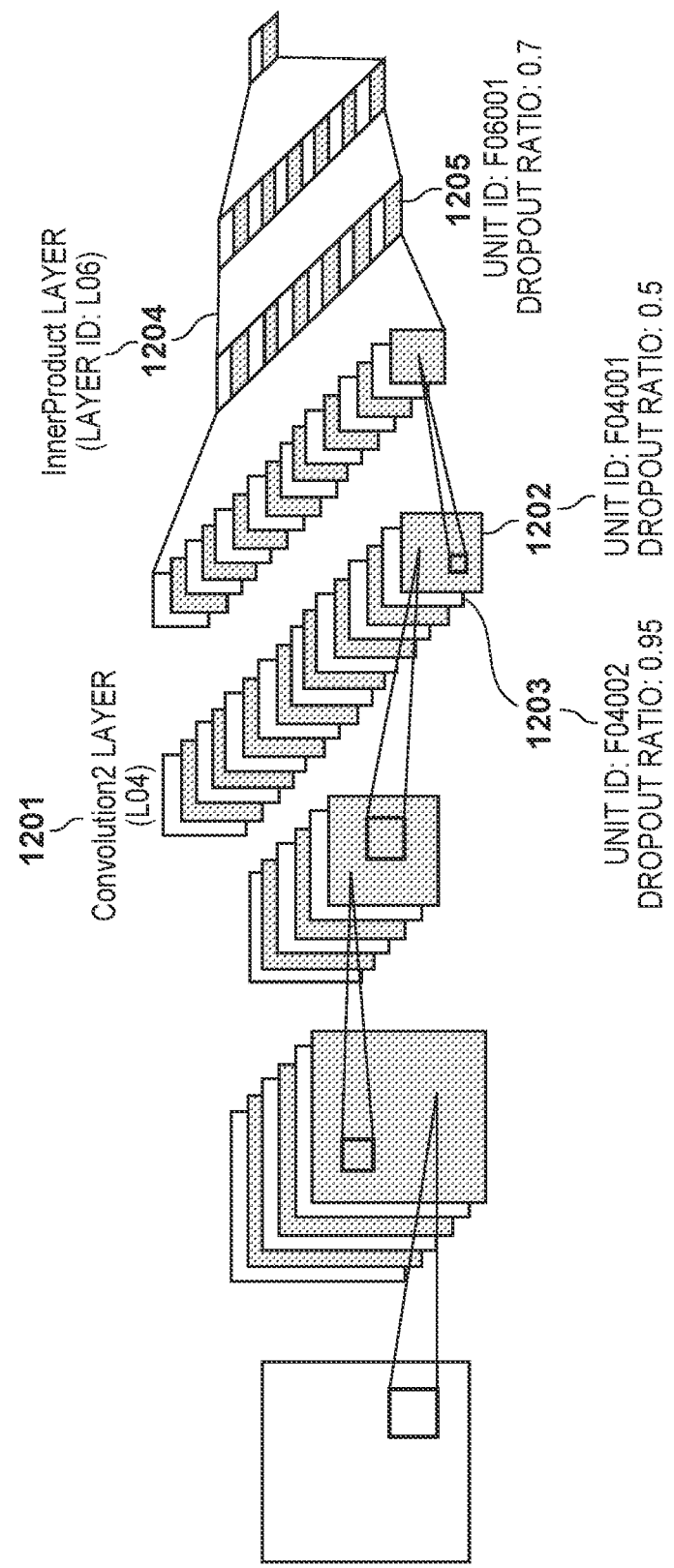
FIG. 11 is a view showing an example of dropout ratios.

FIG. 11 shows an example of dropout ratios set for units. In FIG. 11, dropout ratios of 0.5 and 0.95 are set for feature maps 1202 and 1203 of a Convolution2 layer 1201, respectively. Additionally, in FIG. 11, the dropout ratio of a neuron 1205 of an InnerProduct layer 1204 is set to 0.7.

As the second learning method, the relearning unit 16 adds a penalty term based on the unit ID and the importance information received from the terminal device 100a to the identification error to be minimized, as represented by $$\text{identification error} = E(\theta) + \lambda \theta^T U \theta \quad (4)$$

where θ is a vector having the processing parameter information of each unit of the DNN as an element, E(θ) is the identification error of the DNN with respect to the learning data, λ is a coefficient used to balance the error and the penalty term of the importance, and U is a matrix having the reciprocal of the importance of each unit as a diagonal component. For example, if the importance of the ith unit is 0.5, an element $U_{ii}$ of the matrix U is 2. Here, for a unit of a low importance, the penalty for the processing parameter information of the unit becomes strong. Hence, the DNN learned to minimize equation (4) is learned not to use a unit of a lower importance.

Note that in the first and second learning methods, the processing parameter information of each layer is initialized first and then updated to minimize the identification error, although a detailed description thereof will be omitted. To do this, a gradient method such as Stochastic Gradient Descent (SGD) or AdaDelta (Y. Jia et al., Caffe: Convolutional Architecture for Fast Feature Embedding, 2014) is used.

The relearning unit 16 then stores the updated processing parameter information in the storage unit M1 in association with the layer ID. The structure information of the DNN stored in the storage unit M1 is thus updated by relearning.

Figure 12:
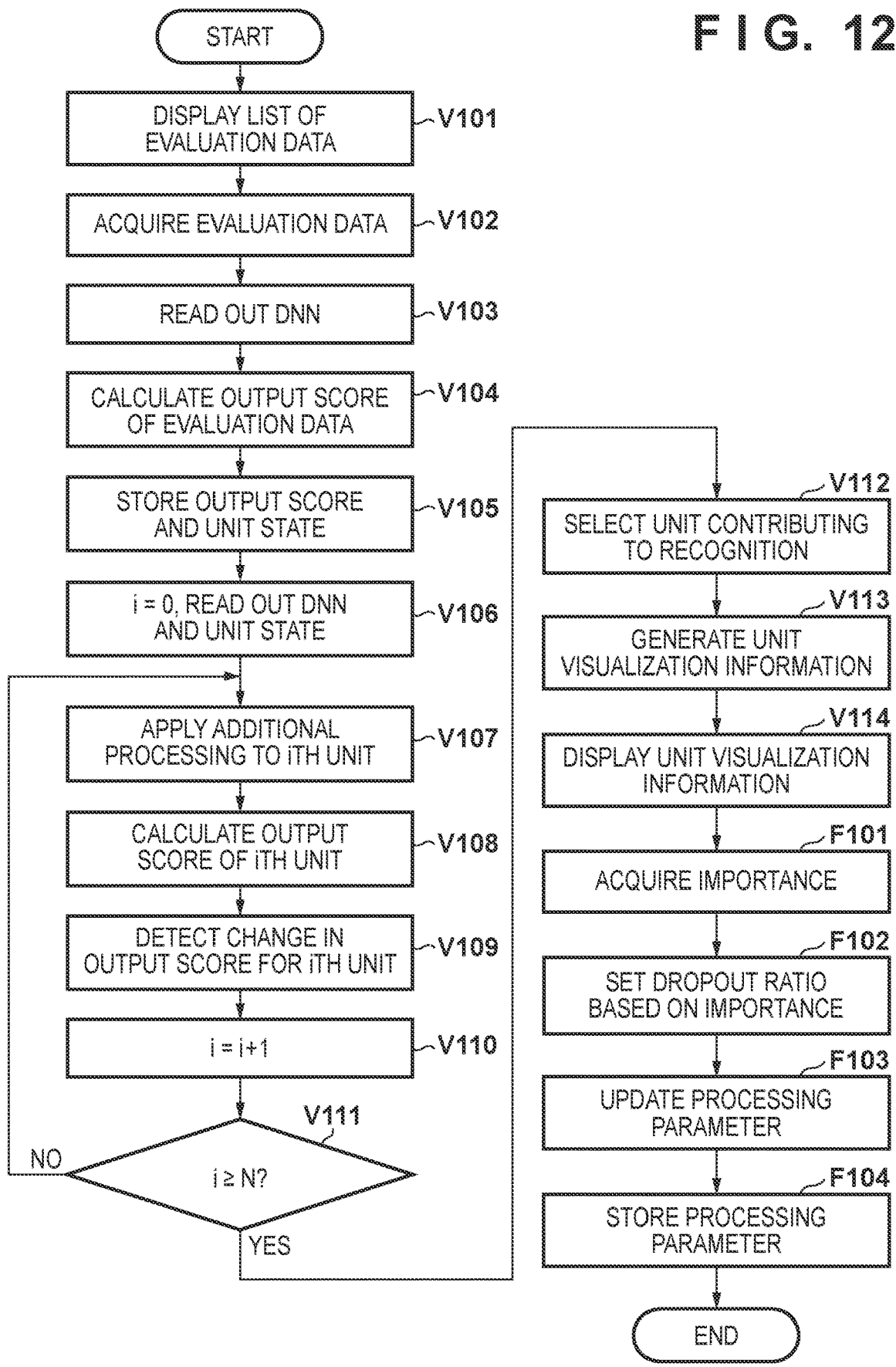

The operation of the recognition learning system 1a according to this embodiment will be described next with reference to the flowchart of FIG. 12. The same step numbers as in FIG. 8 denote the same processing steps in FIG. 12, and a description thereof will be omitted.

Assume that the user performs "input of an importance using the pull-down menu DS401" after the processing of step V114. At this time, the terminal device 100a stores importance information representing the input importance in association with the unit ID of the visualization target unit corresponding to the object DS101 (step F101). On the other hand, if the user performs "instruction of the execution button DS402", the terminal device 100a transmits the importance information and a unit ID stored in association with the importance information to the recognition learning device 10a (step F101).

Next, based on the unit ID and the importance information received from the terminal device 100a, the relearning unit 16 sets the ratio of dropout of each unit in the structure information of the DNN read out from the storage unit M1 (step F102). Next, the relearning unit 16 initializes the processing parameter information and then updates it using a gradient method such as SGD or AdaDelta to minimize the identification error (step F103). Next, the relearning unit 16 stores the processing parameter information updated in step F103 in the storage unit M1 in association with the corresponding layer ID (step F104).

As described above, according to this embodiment, in addition to the effect of the first embodiment, if it is found that the DNN uses an unnecessary feature amount for recognition, the user can set a lower importance for the feature amount and relearn the DNN. This allows the user to obtain a DNN that does not use any unnecessary feature amount by an intuitive and simple operation.

Third Embodiment

Figure 13:
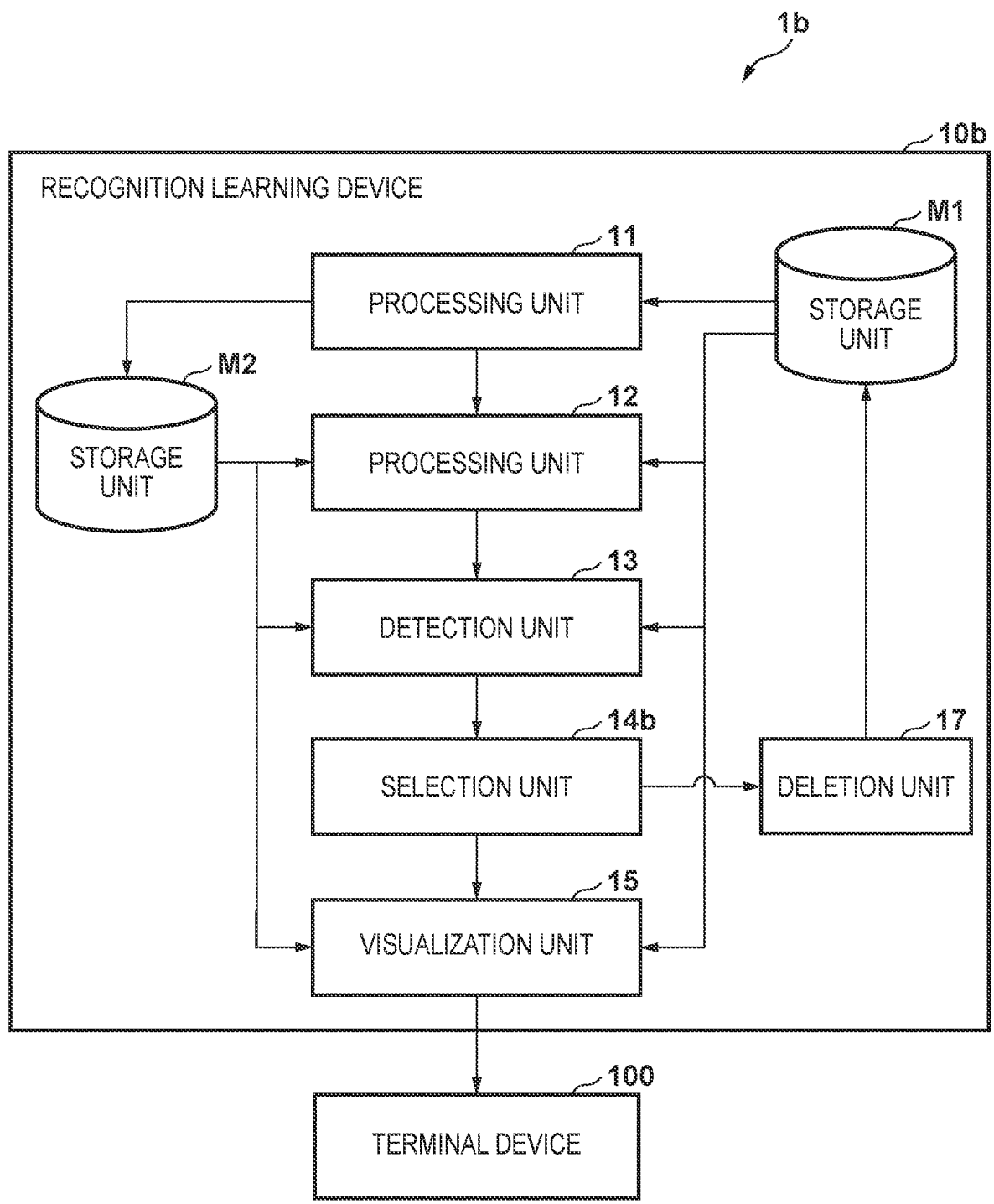
FIG. 13 is a block diagram showing an example of the arrangement of a recognition learning system 1b.

An example of the arrangement of a recognition learning system 1b according to this embodiment will be described with reference to FIG. 13. The recognition learning system 1b according to this embodiment is configured to select a feature map or a neuron whose contribution to recognition of evaluation data prepared by a user is low and delete it from a DNN. Here, the evaluation data is, for example, a video formed by a plurality of images or a plurality of clips in a specific domain. The domain is an environment where the system is assumed to be used, and is, for example, a nursing home, an ordinary household, a public space such as a station or an urban area, or a store.

The recognition learning system 1b according to this embodiment includes a recognition learning device 10b and a terminal device 100. The recognition learning device 10b and the terminal device 100 are configured to communicate data to each other via a wireless or wired network, as in the first embodiment.

Based on change information input from a detection unit 13, a selection unit 14b selects the unit ID of a unit having low contribution to recognition for each input category ID. As the unit ID selection method, the selection unit 14b selects a unit ID with small change information as the unit ID of a unit of low contribution for each category ID. For example, the selection unit 14b obtains the average of change information for various kinds of evaluation data for each unit ID and selects all unit IDs having change information whose average is less than a threshold. Alternatively, the selection unit 14b selects a predetermined number of unit IDs corresponding to the average from the top in ascending order of the average for each category ID. The selection unit 14b then outputs each set of a selected unit ID and change information to a visualization unit 15 and a deletion unit 17 on a category ID basis.

The deletion unit 17 deletes a unit corresponding to each selected unit ID from the DNN. More specifically, according to the input of the set of a selected unit ID and change information from the selection unit 14b, the deletion unit 17 reads out the category ID of the recognition target of the DNN, and a lower layer ID, an upper layer ID, and processing parameter information associated with each layer ID from a storage unit M1. The deletion unit 17 then updates the structure information of the DNN by an updating method based on the selected unit ID input from the selection unit 14b. As the updating method, for example, the weight coefficient and the bias term of the unit of the selected unit ID, which are included in the processing parameter information, are set to 0, thereby deleting the unit. In addition, based on the number of deleted units, the deletion unit 17 decreases the number of filters held by the processing parameter information of the layer to which the unit of each selected unit ID belongs. Then, the deletion unit 17 stores the updated structure information in the storage unit M1.

Note that the visualization unit 15 generates unit visualization information used to visualize the unit corresponding to the selected unit ID. The terminal device 100 displays an object on a display unit DS based on the generated unit visualization information. This allows the user to confirm the unit deleted by the recognition learning device 10b.

Note that the deletion unit 17 may hold the processing parameter information such as the weight coefficient and the bias term of the deleted unit in the recognition learning system 1b. The terminal device 100 displays an "recovery" button on the display unit DS together with the unit visualization information of the deleted unit. If an operation detection unit OP of the terminal device 100 detects operation information representing selection of the unit visualization information and an operation for the "recovery" button by the user, the terminal device 100 transmits the operation information to the deletion unit 17 of the recognition learning device 10b. According to the reception of the operation information from the terminal device 100, the deletion unit 17 selects processing parameter information corresponding to the unit ID corresponding to the unit visualization information selected by the user, which is stored in the local device, and adds the processing parameter information to the storage unit M1. This allows the user to confirm the unit deleted by the recognition learning device 10b, and if it is found that an important unit is deleted, recover the unit to the DNN.

As described above, according to this embodiment, it is possible to delete a feature map or a neuron that does not contribute to recognition of the DNN for evaluation data in a specific domain. This allows the DNN to lightly and quickly perform recognition while maintaining the recognition accuracy. For example, it is possible to learn a DNN capable of coping with a variety of environments using learning data including various domains and adjust the DNN in accordance with a specific domain where the system is actually used.

Fourth Embodiment

Various kinds of processing can be considered as the "predetermined processing" to be performed for unit state information corresponding to a specific unit ID. For example, processing (third processing and fourth processing) to be described below can also be considered.

As the third processing, a processing unit 12 generates, as additional unit information, unit state information associated with an arbitrary unit ID of the same layer as a unit corresponding to a specific unit ID of pieces of unit state information read out from a storage unit M2. Here, the arbitrary unit ID corresponds to, for example, a unit ID adjacent to the specific unit ID, the ID of a unit selected at random, or a fixed unit ID. Here, the random unit ID is selected from, for example, unit IDs of the same layer in accordance with a uniform distribution. Note that as "the predetermined processing", processing such as four arithmetic operations of, for example, adding additional unit information may be performed for predetermined unit state information.

As the fourth processing, the processing unit 12 generates additional unit information representing a feature map or a neuron including elements having a predetermined value and having the same size as the set of numerical values represented by unit state information corresponding to a specific unit ID of pieces of unit state information read out from the storage unit M2. Here, the predetermined value is, for example, a predetermined fixed numerical value pattern.

Processing information necessary for the "predetermined processing" is stored in the local device or in an external storage device. For example, the processing information is stored as part of the structure information of a DNN in a storage unit M1 of the local device. The processing information includes, for example, an ID representing the "predetermined processing", additional unit information, information of a probability distribution to generate a random value, and processing information such as replacement or four arithmetic operations for the additional unit information and specific unit information.

As the "predetermined processing", processing may be performed as part of the structure of the DNN. More specifically, the processing unit 12 generates DNN structure information representing a structure in which a unit addition processing layer configured to perform the "predetermined processing" is inserted between a predetermined layer serving as a processing target and a layer immediately above the predetermined layer. Here, each unit information of the unit addition processing layer corresponds to additional unit information, as will be described later with reference to FIG. 16. The processing parameter information of the DNN structure information is set to apply the "predetermined processing" to each unit information of the layer immediately under the unit addition processing layer. The processing unit 12 stores the generated DNN structure information in the storage unit M1.

Figure 15:
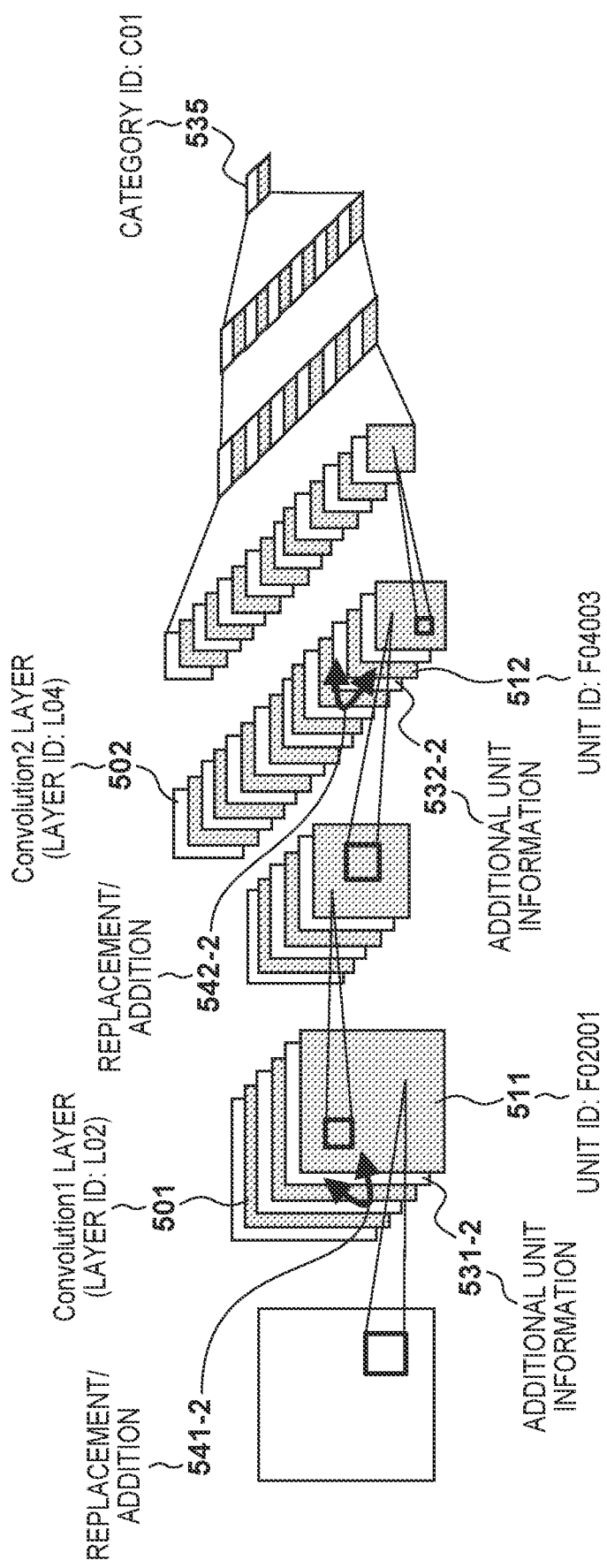
FIG. 15 is a view for explaining a method of obtaining change information.

FIG. 15 is a view showing an example in which the third processing is applied to a visualization target unit of the DNN. First, FIG. 15 explains a case in which units included in a Convolution1 layer 501 and a Convolution2 layer 502 of a DNN stored in the storage unit M1 are set to visualization target units. More specifically, as the third processing, FIG. 15 shows processing of selecting units 531-2 and 532-2 that are adjacent to units 511 and 512 in the same layers, respectively, as additional unit information and replacing (541-2 and 542-2) or adding the unit state information of the units 511 and 512.

Figure 16:
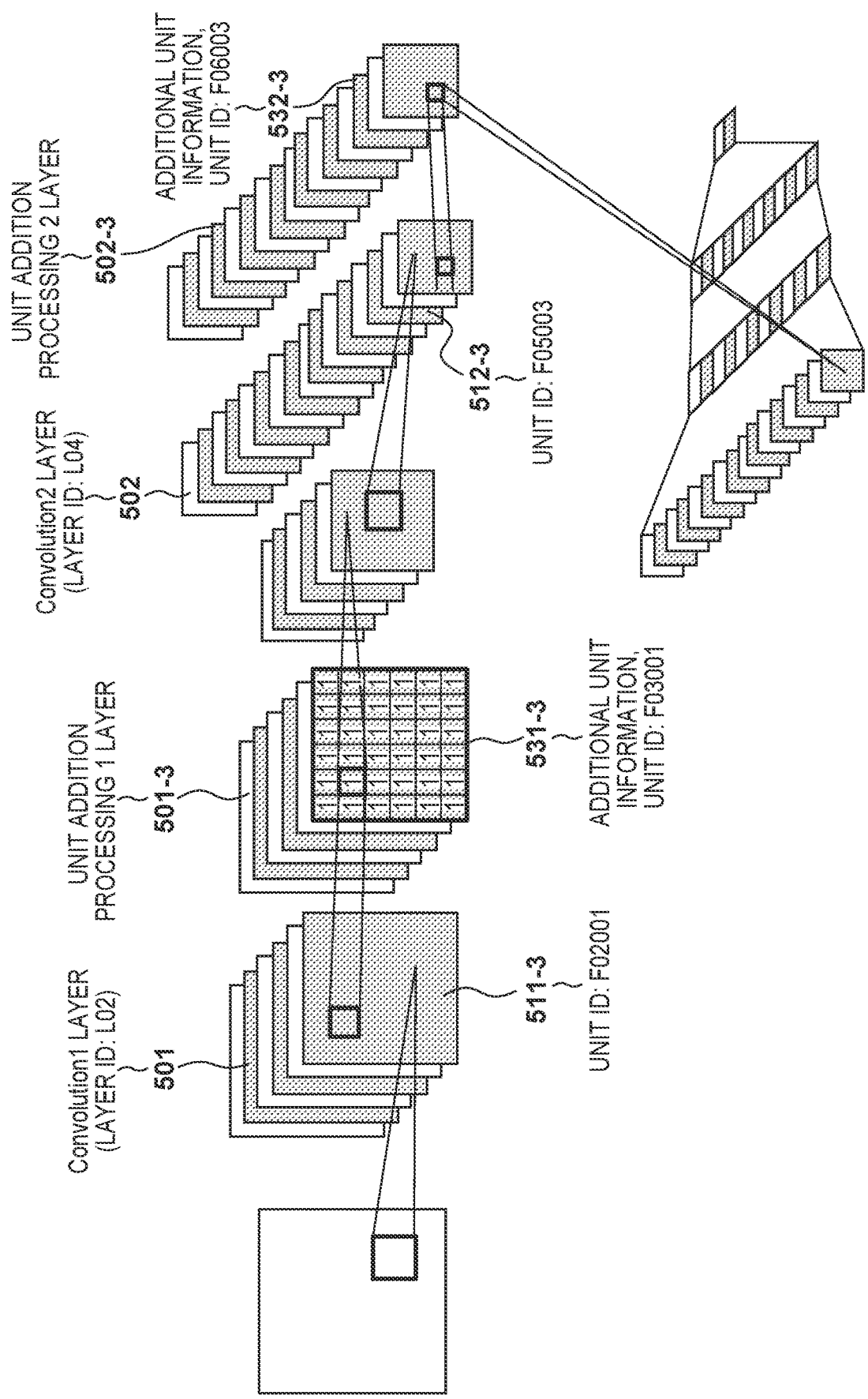
FIG. 16 is a view for explaining a method of obtaining change information.

FIG. 16 is a view showing an example in which the "predetermined processing" is applied as processing of a layer of the DNN. First, FIG. 16 explains a case in which units included in the Convolution1 layer 501 and the Convolution2 layer 502 of the DNN stored in the storage unit M1 are set to visualization target units. More specifically, FIG. 16 shows processing of inputting the outputs of the Convolution1 layer 501 and the Convolution2 layer 502 to a unit addition processing 1 layer 501-3 and a unit addition processing 2 layer 502-3, respectively, and applying the above-described first to fourth processing operations. For example, for a unit having a unit ID "F02001" in the Convolution1 layer, additional unit information of a unit ID "F03001" in the unit addition processing 1 layer is applied. In addition, for a unit having a unit ID "F05003" in the Convolution2 layer, additional unit information of a unit ID "F06003" in the unit addition processing 2 layer is applied. For example, if the fourth processing is used in the unit addition processing 1 layer, the additional unit information "F03001" is set so as to include elements having a predetermined value and have the same size as the unit of the unit ID "F02001", and four arithmetic operations of replacing or adding the unit of the unit ID "F02001" are applied.

Fifth Embodiment

What kind of processing should be performed as "predetermined processing" in a step between step V106 and step V107 in FIG. 8 may be set. In this case, processing for implementing the set "predetermined processing" is performed each subsequent step. For example, a processing unit 12 sets "predetermined processing" based on processing information read out from a storage unit M1. For example, when the predetermined processing is performed as part of the structure of a DNN, as described above with reference to FIG. 16, DNN structure information representing a structure in which a unit addition processing layer is inserted and a processing parameter corresponding to the "predetermined processing" is generated. The processing unit 12 then stores the generated DNN structure information in the storage unit M1.

In the above embodiments, the description has been made using an example of a problem to identify a plurality of states. However, the present invention is not limited to this, and can be applied a general identification problem. For example, the present invention is applicable to a problem of abnormality detection to identify a normal state and an abnormal state.

In the above embodiments, each of the recognition learning devices 10, 10a, and 10b includes the storage units M1 and M2. However, the storage units M1 and M2 may be external devices capable of communicating with the recognition learning device 10, 10a, or 10b. For example, the storage units M1 and M2 may be provided on a server capable of performing data communication with the recognition learning device 10, 10a, or 10b, or another device may include the storage units M1 and M2. This also applies to the other functional units.

In addition, some or all of the arrangements of the above-described embodiments and modifications can appropriately be combined. Alternatively, some or all of the arrangements of the above-described embodiments and modifications may selectively be used.

Sixth Embodiment

Figure 14:
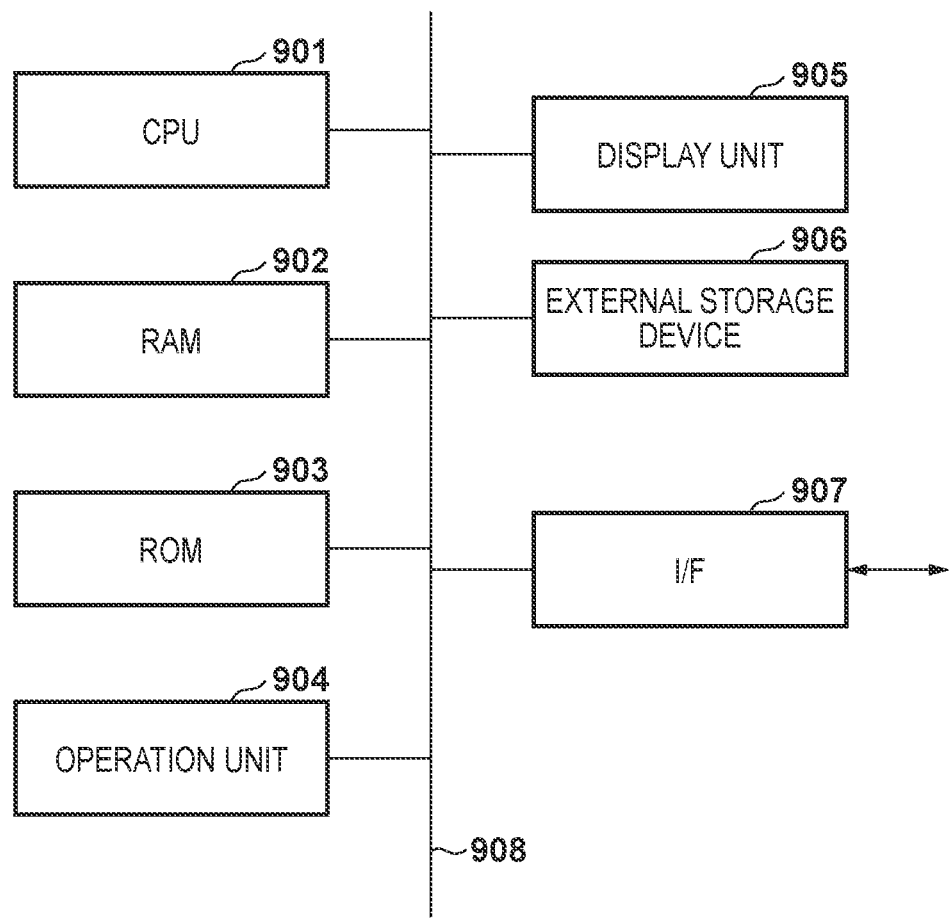
FIG. 14 is a block diagram showing an example of the hardware arrangement of a computer device.

Each functional unit of the recognition learning devices 10, 10a, and 10b may be implemented by hardware. Alternatively, units other than the storage units M1 and M2 may be implemented by software (computer program). In this case, a computer device (including the storage units M1 and M2 or capable of performing data communication with the storage units M1 and M2) capable of executing the software is applicable to the recognition learning devices 10, 10a, and 10b. An example of the hardware arrangement of the computer device will be described with reference to the block diagram of FIG. 14.

A CPU 901 performs processing using a computer program and data stored in a RAM 902 and a ROM 903. The CPU 901 thus controls the operation of the entire computer device and executes or controls the processing described above as processing to be performed by the recognition learning device 10, 10a, or 10b to which the computer device is applied.

The RAM 902 includes an area to store a computer program or data loaded from the ROM 903 or an external storage device 906 or data received from the outside via an I/F (interface) 907. The RAM 902 also includes a work area used by the CPU 901 to execute various kinds of processing. The RAM 902 can thus provide various kinds of areas as needed. The ROM 903 stores setting data and a boot program of the computer device which need not be rewritten.

An operation unit 904 is formed by a user interface such as a mouse or a keyboard. The user can input various kinds of instructions to the CPU 901 by operating the operation unit 904. For example, the user can input setting information such as a threshold to the computer device by operating the operation unit 904.

A display unit 905 is formed by a CRT or a liquid crystal screen and can display the processing result of the CPU 901 as an image or characters. Note that the display unit 905 may be a projector configured to project an image or characters to a projection surface. Note that the operation unit 904 and the display unit 905 may be integrated to form a touch panel screen.

The external storage device 906 is a mass information storage device represented by a hard disk drive. The external storage device 906 stores an OS (Operating System) or computer programs and data configured to cause the CPU 901 to execute or control the processing described above as processing to be performed by the recognition learning device 10, 10a, or 10b. The computer programs include a computer program configured to cause the CPU 901 to execute or control the function of each functional unit of the recognition learning device 10, 10a, or 10b except the storage units M1 and M2 in FIGS. 1, 9, and 13. In addition, the data stored in the external storage device 906 includes data (for example, a threshold) handled by the recognition learning device 10, 10a, or 10b as known information. The storage units M1 and M2 may be provided in the external storage device 906. The computer program or data stored in the external storage device 906 is loaded to the RAM 902 as needed under the control of the CPU 901 and processed by the CPU 901.

The I/F 907 functions as an interface used to perform data communication with an external device. For example, data communication with the terminal device 100 (100a) is performed via the I/F 907.

All of the CPU 901, the RAM 902, the ROM 903, the operation unit 904, the display unit 905, the external storage device 906, and the I/F 907 are connected to a bus 908. Note that the arrangement of the computer device shown in FIG. 14 can also be applied to the terminal device 100 (100a). In this case, the display unit 905 functions as the display unit DS, and the operation detection unit OP can be implemented by the operation unit 904.

As described above, according to the above-described embodiments and modifications, a feature amount of the DNN contributing to recognition of evaluation data can be visualized. For this reason, the user can confirm whether the DNN uses a feature amount unique to learning data or not. In addition, the DNN can be relearned based on feedback of an importance from the user for the visualized feature amount. Hence, the user can control the DNN so as not to use a feature amount unique to the learning data. It is also possible to delete a feature amount of the DNN that does not contribute to recognition of evaluation data. Hence, the DNN can be made quick and light in accordance with the use environment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-131030, filed Jun. 30, 2016, and Japanese Patent Application No. 2017-118841, filed Jun. 16, 2017 which are hereby incorporated by reference herein in their entirety.

What is claimed is:

1. An information processing apparatus comprising:
one or more processors connected to one or more memories storing a program, the one or more processors being configured to:
perform a first calculation to obtain an output value of a first neural network for input data in correspondence with each category of a plurality of categories;
perform a second calculation to obtain an output value of a second neural network for the input data in correspondence with each category, the second neural network being generated by changing a designated unit in the first neural network;
perform a third calculation to obtain, for each category, change information representing a change between the output value obtained by the first calculation and the output value obtained by the second calculation;
output, to a display device, an image of a training environment related to evaluation data;
output, to the display device, a list of unit ID's and a list of category ID's;
receive, from a user, a selection of a designated unit ID and a category ID; and
output information representing contribution of the designated unit to the display device based on the change information obtained by the third calculation, and an indication of a related object that corresponds to the designated unit and selected category in the image.

2. The apparatus according to claim 1, wherein the second neural network is a neural network generated by changing all elements in the designated unit of the first neural network to 0.

3. The apparatus according to claim 1, wherein the second neural network is a neural network generated by adding a predetermined value to each element in the designated unit of the first neural network.

4. The apparatus according to claim 1, wherein each of the first neural network and the second neural network is a neural network including a plurality of layers, and
the second calculation uses, as a processing result by a lower layer under a layer to which the designated unit belongs in the second neural network, a processing result by the lower layer obtained when the first calculation obtains the output value.

5. The apparatus according to claim 1, wherein the third calculation obtains, as the change information, a difference between the output value obtained by the first calculation and the output value obtained by the second calculation.

6. The apparatus according to claim 1, wherein the third calculation obtains the change information based on the output value obtained by the first calculation and information used for the change.

7. The apparatus according to claim 1, wherein the second neural network is each of neural networks generated by sequentially changing a plurality of designated units in the first neural network.

8. The apparatus according to claim 1, wherein, for each category, a predetermined number of change information in descending order and information representing the designated unit corresponding to the change information are outputted.

9. An information processing apparatus comprising:
one or more processors connected to one or more memories storing a program, the one or more processors being configured to:
perform a first calculation to obtain an output value of a first neural network for input data in correspondence with each category;
perform a second calculation to obtain an output value of a second neural network for the input data in correspondence with each category, the second neural network being generated by changing a designated unit in the first neural network;
perform a third calculation to obtain, for each category, change information representing a change between the output value obtained by the first calculation and the output value obtained by the second calculation; and
output information representing contribution of the designated unit to a display device based on the change information obtained by the third calculation, and
wherein for each category, a predetermined number of designated units in ascending order of an average of the change information for a plurality of input data are specified, and the change information obtained by the third calculation for the specified designated units, and information representing the specified designated units are output.

10. The apparatus according to claim 9, the one or more processors being further configured to delete the specified designated unit from the first neural network.

11. The apparatus according to claim 1, wherein information representing a feature of the input data corresponding to the designated unit to the display device is output.

12. The apparatus according to claim 11, the one or more processors being further configured to receive selection of a unit by a user,
wherein the unit selected by the user is set to the designated unit and causes the display device to display the information representing the feature of the input data corresponding to the unit.

13. The apparatus according to claim 12, the one or more processors being further configured to receive selection of a category by the user,
wherein the display device is caused to display the information representing the feature of the input data corresponding to the unit and the category selected by the user.

14. The apparatus according to claim 1, wherein information representing an element in the input data corresponding to the designated unit is output and the display device is caused to identifiably display the element in the input data.

15. The apparatus according to claim 14, the one or more processors being further configured to, when an importance for the element displayed on the display device is input, relearn the first neural network using a learning method with importance using the importance.

16. The apparatus according to claim 1, wherein the unit is one of a feature map and a neuron of a neural network.

17. An information processing method performed by an information processing apparatus, comprising:
  performing a first calculation to obtain an output value of a first neural network for input data in correspondence with each category of a plurality of categories;
  performing a second calculation to obtain an output value of a second neural network for the input data in correspondence with each category, the second neural network being generated by changing a designated unit in the first neural network;
  performing a third calculation to obtain, for each category, change information representing a change between the output value obtained by the first calculation and the output value obtained by the second calculation;
  outputting, to a display device, an image of a training environment related to evaluation data;
  outputting, to the display device, a list of unit ID's and a list of category ID's;
  receiving, from a user, a selection of a designated unit ID and a category ID; and
  outputting information representing contribution of the designated unit to the display device based on the change information obtained by the third calculation, and an indication of a related object that corresponds to the designated unit and selected category in the image.

18. A non-transitory computer-readable storage medium storing a computer program configured to, when executed by a computer cause an information processing apparatus to perform an information processing method, the method comprising:
  performing a first calculation to obtain an output value of a first neural network for input data in correspondence with each category of a plurality of categories;
  performing a second calculation to obtain an output value of a second neural network for the input data in correspondence with each category, the second neural network being generated by changing a designated unit in the first neural network;
  performing a third calculation to obtain, for each category, change information representing a change between the output value obtained by the first calculation and the output value obtained by the second calculation;
  outputting, to a display device, an image of a training environment related to evaluation data;
  outputting, to the display device, a list of unit ID's and a list of category ID's;
  receiving, from a user, a selection of a designated unit ID and a category ID; and
  outputting information representing contribution of the designated unit to the display device based on the change information obtained by the third calculation, and an indication of a related object that corresponds to the designated unit and selected category in the image.

* * * * *